United States Patent
Huntington et al.

(10) Patent No.: US 10,727,768 B2
(45) Date of Patent: Jul. 28, 2020

(54) SYSTEM AND METHOD FOR A STOICHIOMETRIC EXHAUST GAS RECIRCULATION GAS TURBINE SYSTEM

(71) Applicants: General Electric Company, Schenectady, NY (US); ExxonMobile Upstream Research Company, Spring, TX (US)

(72) Inventors: Richard A. Huntington, Houston, TX (US); Karl Dean Minto, Ballston Lake, NY (US); Bin Xu, The Woodlands, TX (US); Jonathan Carl Thatcher, Pendleton, SC (US); Aaron Lavene Vorel, Greenville, SC (US)

(73) Assignee: ExxonMobil Upstream Research Company, Spring, TX (US)

( * ) Notice: Subject to any disclaimer, the term of this patent is extended or adjusted under 35 U.S.C. 154(b) by 55 days.

(21) Appl. No.: 16/121,163

(22) Filed: Sep. 4, 2018

(65) Prior Publication Data
US 2019/0013756 A1    Jan. 10, 2019

Related U.S. Application Data

(62) Division of application No. 14/585,950, filed on Dec. 30, 2014, now Pat. No. 10,079,564.
(Continued)

(51) Int. Cl.
*H02P 9/04* (2006.01)
*F01D 17/02* (2006.01)
(Continued)

(52) U.S. Cl.
CPC .............. *H02P 9/04* (2013.01); *E21B 43/166* (2013.01); *F01D 17/02* (2013.01); *F02C 3/30* (2013.01);
(Continued)

(58) Field of Classification Search
CPC .............. F01D 17/02; F05D 2270/082; F05D 2270/08; F05D 2220/32; F05D 2270/05;
(Continued)

(56) References Cited

U.S. PATENT DOCUMENTS 2,488,911 A    11/1949    Hepburn et al.
2,884,758 A    5/1959    Oberle
(Continued)

FOREIGN PATENT DOCUMENTS

CA    2231749    9/1998
CA    2645450    9/2007
(Continued)

OTHER PUBLICATIONS

Ahmed, S. et al. (1998) "Catalytic Partial Oxidation Reforming of Hydrocarbon Fuels," 1998 Fuel Cell Seminar, 7 pgs.
(Continued)

*Primary Examiner* — Shogo Sasaki
(74) *Attorney, Agent, or Firm* — Fletcher Yoder, P.C.

(57) ABSTRACT

A system includes a control system configured to control one or more parameters of an exhaust gas recirculation (EGR) gas turbine system to control a portion of electrical power for export from a generator driven by the turbine to an electrical grid. The control system includes a closed-loop controller configured to control parameters of the EGR gas turbine system and an open-loop controller configured to temporarily control the parameters of the EGR gas turbine system to increase the portion of the electrical power exported to the electrical grid to provide a Primary Frequency Response (PFR) in response to a transient event associated with the electrical power. The open-loop controller is configured to provide control signals to increase a concentration of an oxidant in a combustor to provide the
(Continued)

PFR in response to the transient event when the EGR gas turbine system is operating in an emissions compliant mode.

20 Claims, 8 Drawing Sheets

Related U.S. Application Data

(60) Provisional application No. 61/932,178, filed on Jan. 27, 2014.

(51) Int. Cl.
    *F02C 9/28* (2006.01)
    *E21B 43/16* (2006.01)
    *F02C 3/30* (2006.01)
    *F02C 6/00* (2006.01)
    *F02C 9/48* (2006.01)
    *H02K 7/18* (2006.01)

(52) U.S. Cl.
    CPC ............ *F02C 6/00* (2013.01); *F02C 9/28* (2013.01); *F02C 9/48* (2013.01); *H02K 7/1823* (2013.01); *F05D 2220/32* (2013.01); *F05D 2270/05* (2013.01); *F05D 2270/08* (2013.01); *F05D 2270/082* (2013.01); *Y02E 20/16* (2013.01); *Y02T 50/677* (2013.01)

(58) Field of Classification Search
    CPC ...... F02C 3/30; F02C 9/28; F02C 9/48; F02C 6/00; H02K 7/1823; Y02E 20/16; H02P 9/04
    See application file for complete search history.

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kicker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |

(56) References Cited

U.S. PATENT DOCUMENTS

| | | |
|---|---|---|
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,038,849 A | 3/2000 | Nakhamkin et al. |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,794,766 B2 | 9/2004 | Wickert et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |

(56) References Cited

U.S. PATENT DOCUMENTS

| | | |
|---|---|---|
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakia et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |

(56) References Cited

U.S. PATENT DOCUMENTS

| | | |
|---|---|---|
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chin et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 9,574,496 B2 | 2/2017 | Fadde et al. |
| 9,581,081 B2 | 2/2017 | Biyani et al. |
| 9,631,815 B2 | 4/2017 | Antoniono et al. |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0006592 A1 | 1/2007 | Balan et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |

(56) References Cited

U.S. PATENT DOCUMENTS

| | | |
|---|---|---|
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | Elkady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310356 A1 | 12/2010 | Swintek |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0257801 A1 | 10/2011 | Kumula et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023959 A1* | 2/2012 | Snook ............... F02C 3/34 60/772 |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1* | 2/2012 | Ouellet ............... F02C 7/277 60/778 |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2013/0340404 A1 | 12/2013 | Hughes |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0182298 A1 | 7/2014 | Krull et al. |
| 2014/0182303 A1 | 7/2014 | Antoniono et al. |
| 2014/0182304 A1 | 7/2014 | Antoniono et al. |
| 2014/0182305 A1 | 7/2014 | Antoniono et al. |
| 2015/0226133 A1 | 8/2015 | Minto et al. |

FOREIGN PATENT DOCUMENTS

| | | |
|---|---|---|
| EP | 0770771 | 5/1997 |
| GB | 0776269 | 6/1957 |
| GB | 2117053 | 10/1983 |
| JP | 2003239763 A | 8/2003 |
| JP | 2004027848 A | 1/2004 |
| JP | 2007315398 A | 12/2007 |
| JP | 2008051099 A | 3/2008 |
| JP | 2013048541 A | 3/2013 |
| JP | 2013213496 A | 10/2013 |
| RU | 2034192 C1 | 4/1995 |
| SU | 1744290 A | 6/1992 |
| WO | WO1999006674 | 2/1999 |
| WO | WO1999063210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |

(56) References Cited

FOREIGN PATENT DOCUMENTS

| WO | WO2013147632 | 10/2013 |
|---|---|---|
| WO | WO2013147633 | 10/2013 |
| WO | WO2013155214 | 10/2013 |
| WO | WO2013163045 | 10/2013 |
| WO | WO2014071118 | 5/2014 |
| WO | WO2014071215 | 5/2014 |
| WO | 2014133406 A1 | 9/2014 |

OTHER PUBLICATIONS

Air Products and Chemicals, Inc. (2008) "Air Separation Technology—Ion Transport Membrane (ITM)," www.airproducts.com/ASUsales, 3 pgs.

Air Products and Chemicals, Inc. (2011) "Air Separation Technology Ion Transport Membrane (ITM)," www.airproducts.com/gasification, 4 pgs.

Anderson, R. E. (2006) "Durability and Reliability Demonstration of a Near-Zero-Emission Gas-Fired Power Plant," California Energy Comm., CEC 500-2006-074, 80 pgs.

Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.

Holland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.

BP Press Release (2006) "BP and Edison Mission Group Plan Major Hydrogen Power Project for California," www.bp.com/hydrogenpower, 2 pgs.

Biyngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, 42 pgs.

Foy, Kirsten et al. (2005) "Comparison of Ion Transport Membranes" Fourth Annual Conference on Carbon Capture and Sequestration, DOE/NETL; 11 pgs.

Cho, J. H. et al. (2005) "Marrying LNG and Power Generation," Energy Markets; 10, 8; ABI/INFORM Trade & Industry, 5 pgs.

Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.

Science Clarified (2012) "Cryogenics," http://www.scienceclarified.com/Co-Di/Cryogenics.html; 6 pgs.

Defrate, L. A. et al. (1959) "Optimum Design of Ejector Using Digital Computers" Chem. Eng. Prog. Symp. Ser., 55 ( 21), 12 pgs.

Ditaranto, M. et al. (2006) "Combustion Instabilities in Sudden Expansion Oxy-Fuel Flames," ScienceDirect, Combustion and Flame, v.146, 20 pgs.

Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.

Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.

Ertesvag, I. S. et al. (2005) "Exergy Analysis of a Gas-Turbine Combined-Cycle Power Plant With Precombustion $CO_2$ Capture," Elsevier, 35 pgs.

ElKady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.

Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.

Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.

Luby, P. et al. (2003) "Zero Carbon Power Generation: IGCC as the Premium Option," Powergen International, 19 pgs.

MacAdam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.

Morehead, H. (2007) "Siemens Global Gasification and IGCC Update," Siemens, Coal-Gen, 17 pgs.

Nanda, R. et al. (2007) "Utilizing Air Based Technologies as Heat Source for LNG Vaporization," presented at the $86^{th}$ Annual convention of the Gas Processors of America (GPA 2007), , San Antonio, TX; 13 pgs.

Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.

Reeves, S. R. (2003) "Enhanced Coalbed Methane Recovery," Society of Petroleum Engineers 101466-DL; SPE Distinguished Lecture Series, 8 pgs.

Richards, Geo A., et al (2001) "Advanced Steam Generators," National Energy Technology Lab., Pittsburgh, PA; and Morgantown. WV; NASA Glean Research Center (US), 7 pgs.

Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.

Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.

van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.

Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

Final Rejection for JP Application No. 2016-548624 dated Jul. 29, 2019, pp. 1-2.

Ciulia, Vincent. (2001) "Auto Repair. How the Engine Works," http://autorepair.about.com/cs/generalinfo/a/aa060500a.htm, 1 page, (last viewed Aug. 17, 2012).

PCT Search Report and Written Opinion for related PCT Application No. PCT/US2014/073048 dated Mar. 24, 2015, pp. 1-10.

Decision to Grant, Russian Application No. 2016134897/6(054504), dated Nov. 27, 2018.

Notification of Reason for Rejection, Japanese Patent Application No. 2016-548624, dated Nov. 29, 2018.

Notice of Acceptance for Patent Application, Australian Patent Application No. 2014379485, dated Jan. 7, 2019.

\* cited by examiner

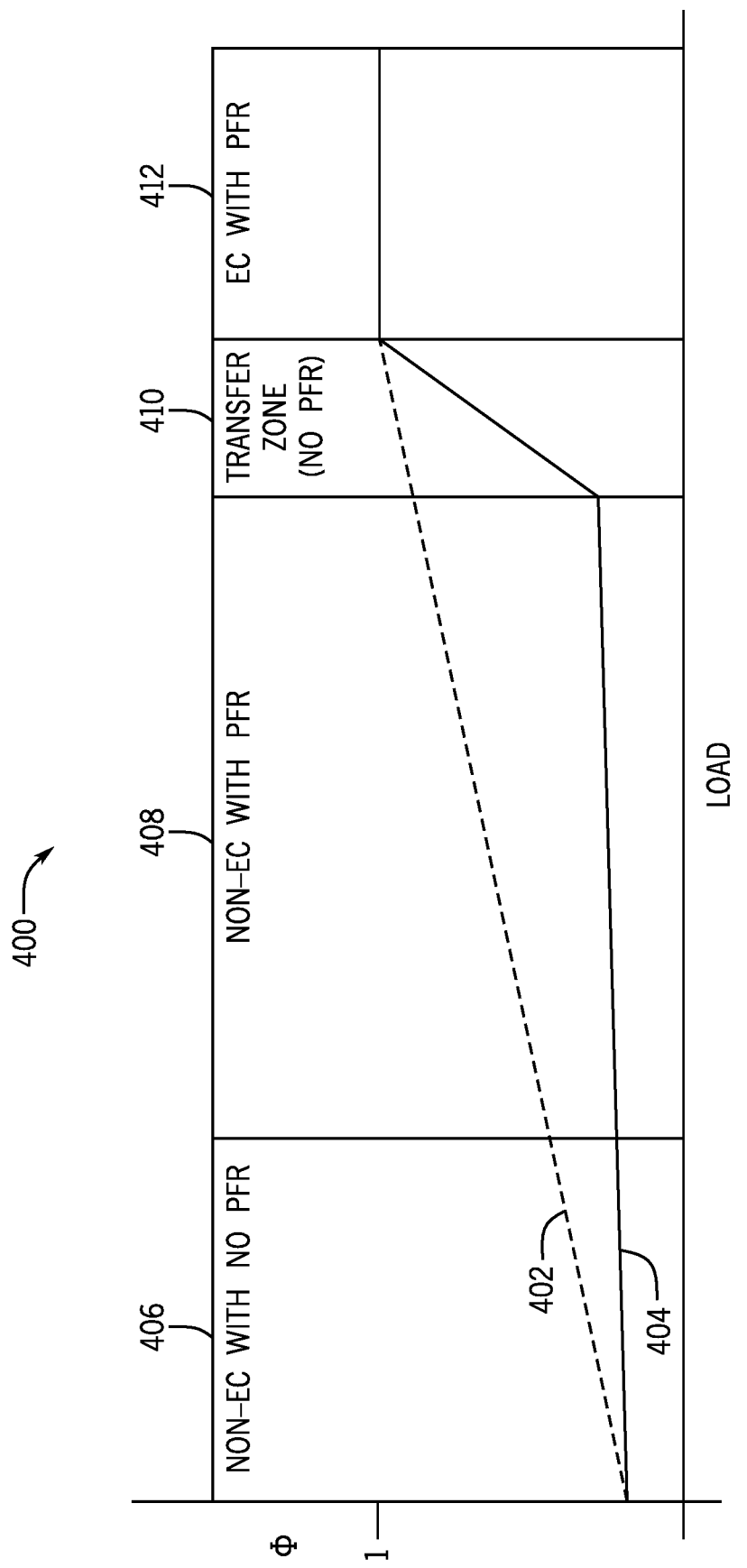

SYSTEM AND METHOD FOR A STOICHIOMETRIC EXHAUST GAS RECIRCULATION GAS TURBINE SYSTEM

CROSS-REFERENCE TO RELATED APPLICATIONS

This application is a divisional of U.S. patent application Ser. No. 14/585,950, entitled "SYSTEM AND METHOD FOR A STOICHIOMETRIC EXHAUST GAS RECIRCULATION GAS TURBINE SYSTEM," filed Dec. 30, 2014, which issued as U.S. Pat. No. 10,079,564 on Sep. 18, 2018, and which claims priority to and benefit of U.S. Provisional Patent Application No. 61/932,178, entitled "SYSTEM AND METHOD FOR A STOICHIOMETRIC EXHAUST GAS RECIRCULATION GAS TURBINE SYSTEM," filed on Jan. 27, 2014, which are herein incorporated by reference in their entireties for all purposes.

BACKGROUND

The subject matter disclosed herein relates to gas turbine systems and, more specifically, to gas turbine driven power plants.

Gas turbine engines are used in a wide variety of applications, such as power generation, aircraft, and various machinery. Gas turbine engine generally combust a fuel with an oxidant (e.g., air) in a combustor section to generate hot combustion products, which then drive one or more turbine stages of a turbine section. In turn, the turbine section drives one or more compressor stages of a compressor section, thereby compressing oxidant for intake into the combustor section along with the fuel. Again, the fuel and oxidant mix in the combustor section, and then combust to produce the hot combustion products. These combustion products may include unburnt fuel, residual oxidant, and various emissions (e.g., nitrogen oxides) depending on the condition of combustion. Furthermore, gas turbine engines typically consume a vast amount of air as the oxidant, and output a considerable amount of exhaust gas into the atmosphere. In other words, the exhaust gas is typically wasted as a byproduct of the gas turbine operation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a method includes combusting a fuel and an oxidant in a combustor of an exhaust gas recirculation (EGR) gas turbine system that produces electrical power and provides a portion of the electrical power to an electrical grid. The method includes controlling one or more parameters of the EGR gas turbine system to increase the portion of the electrical power provided to the electrical grid in response to a transient event associated with the electrical grid. Furthermore, controlling includes one or more of: (A) increasing a flow rate of fuel to the combustor in response to the transient event when the EGR gas turbine system is operating in a fuel-lean combustion mode; (B) increasing a concentration and/or the flow rate of the oxidant in the combustor in response to the transient event, and increasing a flow rate of the fuel to the combustor in response to the increased concentration and/or flow rate of the oxidant to maintain a substantially stoichiometric equivalence ratio in the combustor; or (C) decreasing a local consumption of the electrical power in response to the transient event to increase the portion of electrical power provided to the electrical grid.

In another embodiment, a system includes an exhaust gas recirculation (EGR) gas turbine system having a combustor configured to receive and combust a fuel with an oxidant and a turbine driven by combustion products from the combustor. The system includes a generator driven by the turbine, wherein the generator is configured to generate electrical power and to export a portion of the electrical power to an electrical grid. The system includes a control system having a closed-loop controller configured to control one or more parameters of the EGR gas turbine system and an open-loop controller configured to temporarily control the one or more parameters of the EGR gas turbine system to increase the portion of the electrical power exported to the electrical grid in response to a transient event. Further, the open-loop controller is configured to: provide control signals to increase a flow rate of fuel to the combustor in response to the transient event when the EGR gas turbine system is operating in a non-emissions compliant mode; and provide control signals to increase a concentration of the oxidant in the combustor, or decrease a local consumption of the electrical power, or both, in response to the transient event when the EGR gas turbine system is operating in an emissions compliant mode.

In another embodiment, a non-transitory, computer readable medium stores instructions executable by a processor of an electronic device. The instructions include instructions to determine that a transient event is occurring in an electrical grid coupled to an EGR gas turbine system, wherein the transient event is an under-frequency or an under-voltage event. The instructions also include instructions to increase a flow rate of fuel to a combustor of the EGR gas turbine system in response to the transient event when the EGR gas turbine system is operating in a non-stoichiometric combustion mode. The instructions further include instructions to increase a flow rate of oxidant to the combustor before increasing the flow rate of fuel to the combustor, or to decrease a local consumption of the electrical power to increase a portion of the electrical power that is exported to the attached electrical grid, or both, in response to the transient event when the EGR gas turbine system is operating in a stoichiometric combustion mode.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 8 is a graph illustrating equivalence ratio versus load for different loading profiles for a gas turbine system during startup, in accordance with an embodiment of the present approach.

DETAILED DESCRIPTION

Figure 1:
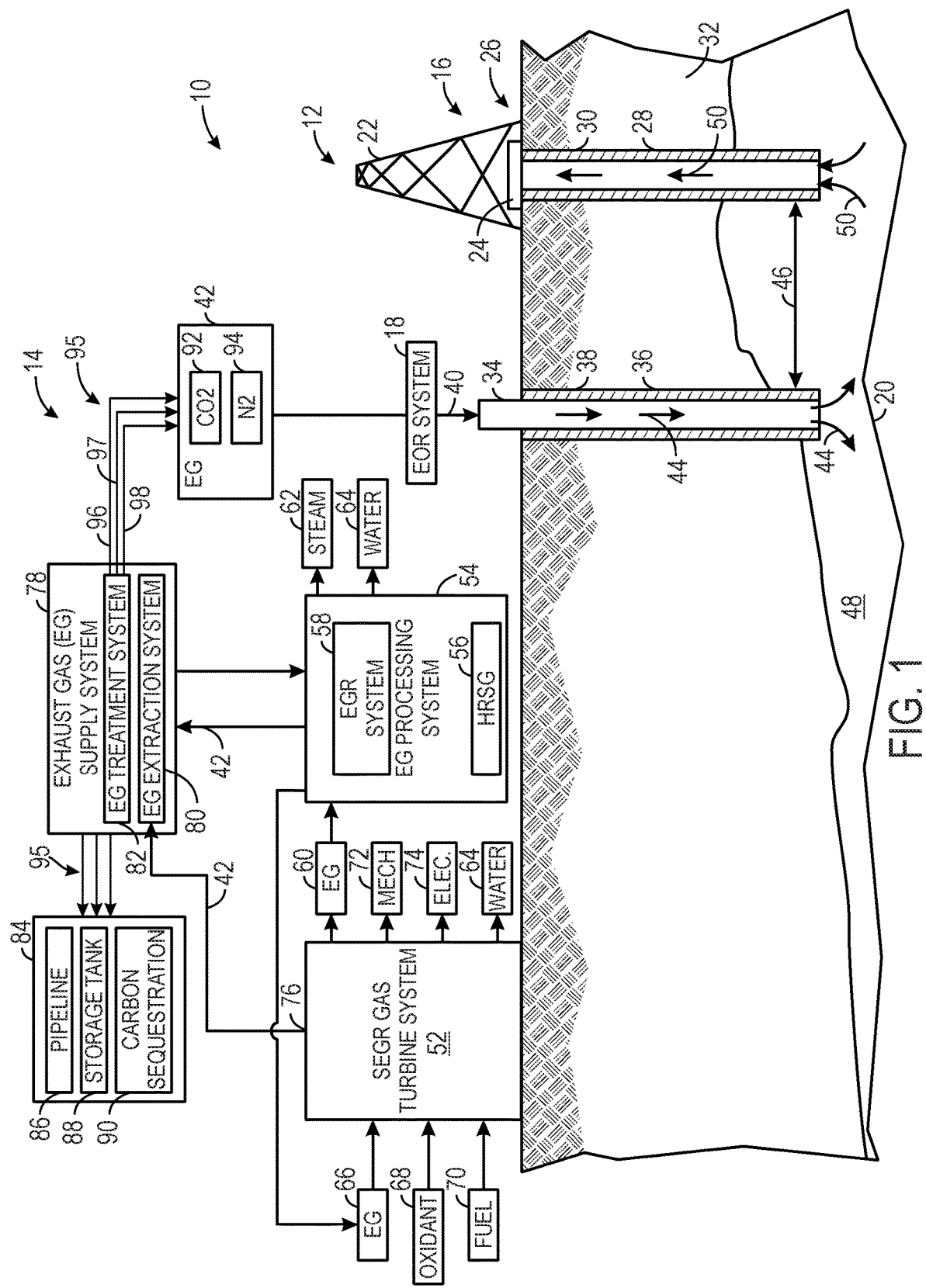
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. The recirculation of the exhaust gas along with stoichiometric combustion may help to increase the concentration level of carbon dioxide ($CO_2$) in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units). Furthermore, the gas turbine engines may be configured to combust the fuel and oxidant with one or more diffusion flames (e.g., using diffusion fuel nozzles), premix flames (e.g., using premix fuel nozzles), or any combination thereof. In certain embodiments, the diffusion flames may help to maintain stability and operation within certain limits for stoichiometric combustion, which in turn helps to increase production of $CO_2$. For example, a gas turbine system operating with diffusion flames may enable a greater quantity of EGR, as compared to a gas turbine system operating with premix flames. In turn, the increased quantity of EGR helps to increase $CO_2$ production. Possible target systems include pipelines, storage tanks, carbon sequestration systems, and hydrocarbon production systems, such as enhanced oil recovery (EOR) systems.

In particular, present embodiments are directed toward gas turbine systems, namely stoichiometric exhaust gas recirculation (EGR) systems including ultra-low emission technology (ULET) power plants. These systems generally include at least one gas turbine engine that is coupled to, and generates electrical power for, an electrical grid. For example, present embodiments include a ULET power plant having one or more electrical generators that convert a portion of the mechanical power provided by one or more EGR gas turbine engines into electrical power for delivery to the electrical grid. It may be appreciated that such a ULET power plant may attempt to respond to transient events (e.g., periods of rapid change in the voltage and/or frequency) in the electrical grid. For example, a ULET power plant may respond to a transient event by augmenting the mechanical power output of the one or more gas turbines in order to augment the electrical power output of the one or more generators and address the transient event. By specific example, a transient event on the electrical grid may include a frequency dip (e.g., 1% drop in the grid frequency), and a ULET power plant may increase its electrical power output (e.g., pick up 10% of the rated base load capacity of the power plant) within a certain window of time (e.g., within approximately 10 seconds of the beginning of the transient event) to address the transient event. For example, a response to the transient event may include a rapid increase in both oxidant and fuel flow to the combustors of the SEGR gas turbine system, thereby maintaining substantially stoichiometric combustion while increasing power output. Unfortunately, without the disclosed embodiments, a ULET powered by using a SEGR gas turbine system may not have any excess oxidant (e.g., air or oxygen) to enable a rapid response to the transient event, because the SEGR system operates at or near a stoichiometric ratio of fuel and oxidant.

Accordingly, as set forth in greater detail below, present embodiments are directed toward methods for controlling components of a power producing SEGR gas turbine system (e.g., a ULET power plant) to quickly increase the mechanical and/or electrical power output of the system in order to address transient events (e.g., frequency and/or voltage drops) in the attached electrical grid. In particular, certain present embodiments may enable a ULET power plant to quickly increase an amount of available oxidant in a combustor in order to quickly increase the available mechanical and electrical power of the system. Additionally, certain embodiments may enable a ULET power plant to increase an amount of available oxidant in a combustor during plant loading (e.g., during start-up) to address transient grid events that occur when the power plant is operating in a non-emission complaint mode. Other presently disclosed embodiments may enable a ULET power plant to disable certain components of the ULET power plant (e.g., a product gas compressor) in order to reduce or limit electrical power consumption within the power plant, which may temporarily increase the amount of electrical power exported from the plant to support the electrical grid during the transient event. Additionally, present embodiments enable control systems that utilize combinations of closed-loop and open-loop control strategies, and may further allow a ULET power plant to temporarily operate beyond certain programmed operational constraints or limits (e.g., a torque limit of the gas turbine engine) in order to address a transient event on the electrical grid.

With the foregoing in mind, FIG. 1 is a diagram of an embodiment of a system 10 having a hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, Hz, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
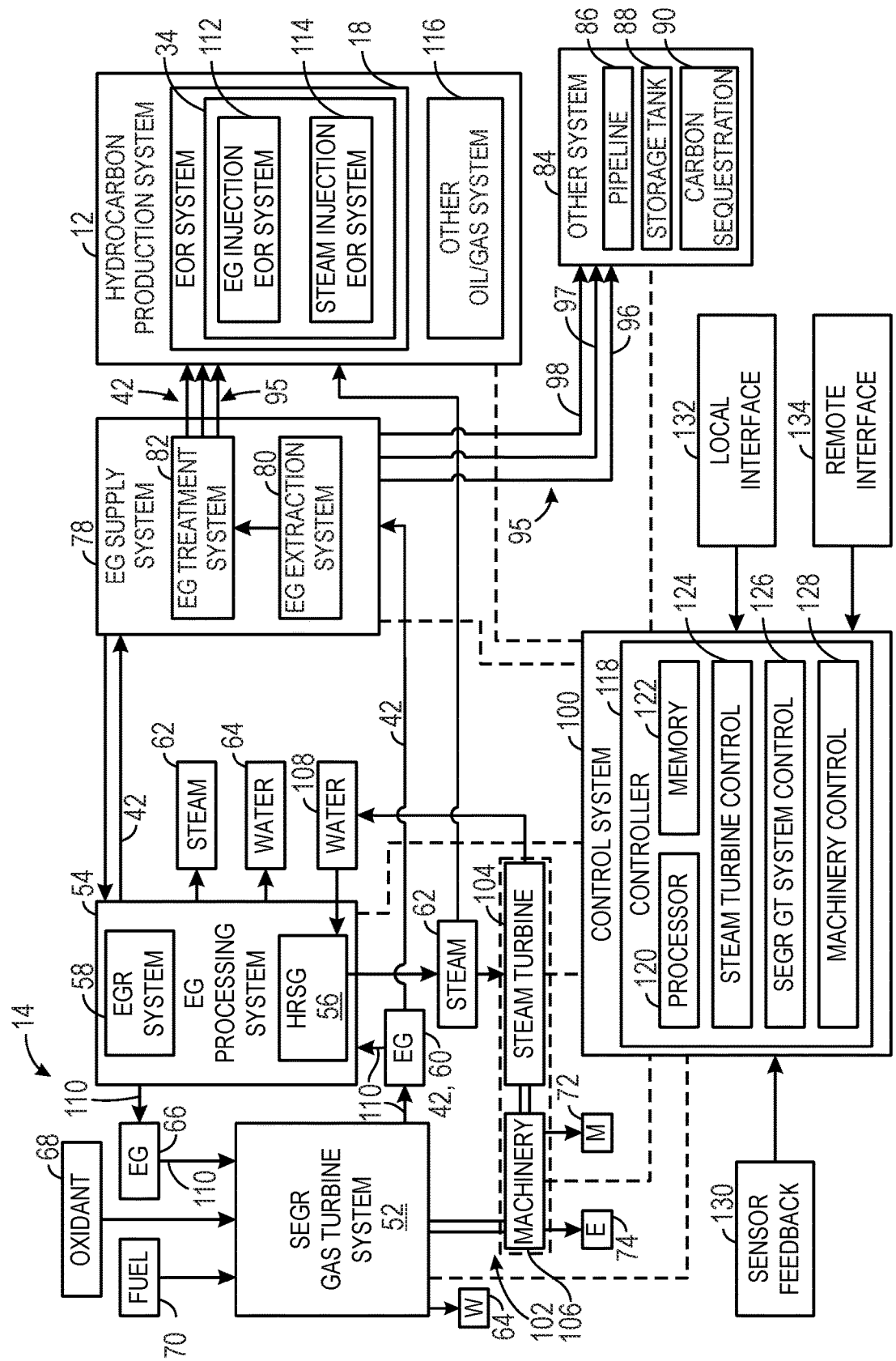
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_x$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_x$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
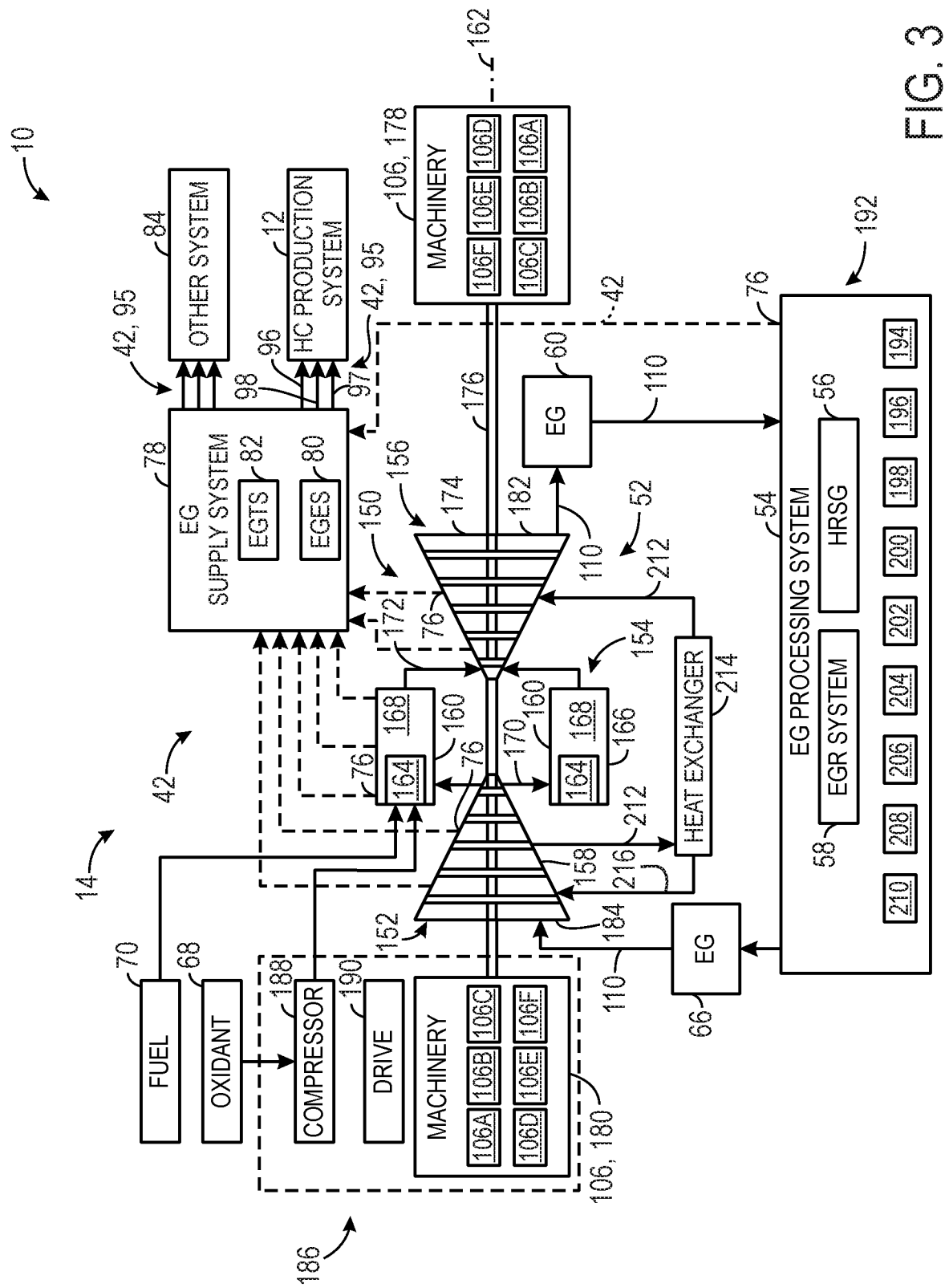
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors, heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC | GEN | | | | |
| MOC | GBX | GEN | | | |
| LP MOC | HP MOC | GEN | | | |
| HP MOC | GBX | LP MOC | GEN | | |
| MOC | GBX | GEN | | | |
| MOC | | | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP MOC | GBX | LP MOC | GEN | | |
| MOC | CLR | MOC | | | |
| HP MOC | GBX | LP MOC | GBX | GEN | |
| MOC | CLR | MOC | | | |
| HP MOC | GBX | LP MOC | GEN | | |
| MOC | HTR STGN | MOC | | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
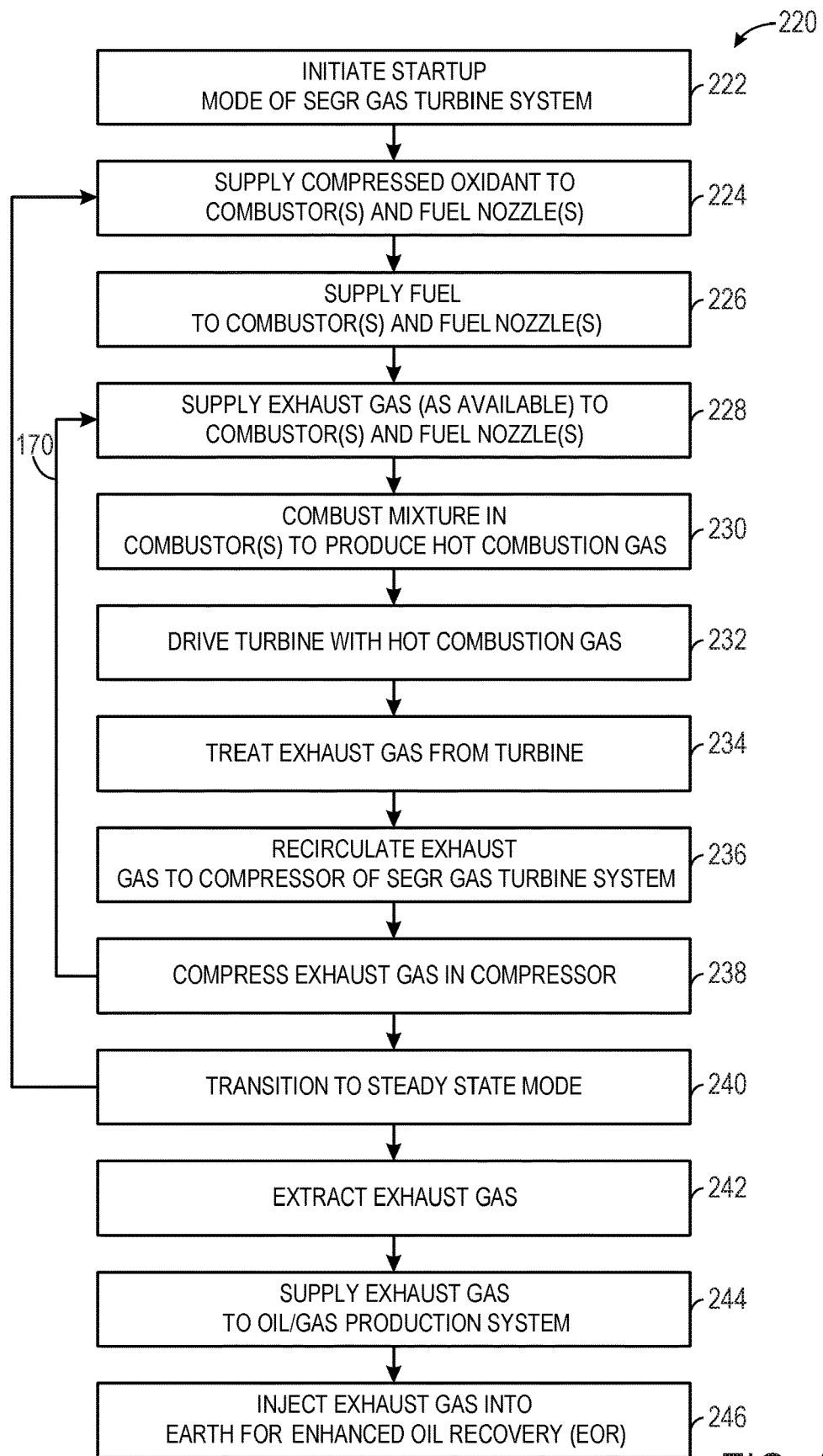
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As set forth above, present embodiments enable the control of the SEGR gas turbine system 52 (e.g., a ULET power plant) to support an electrical grid during transient grid events. In other words, present embodiments enable a ULET power plant to quickly increase its load to support an electrical grid experiencing a voltage or frequency event. By specific example, a ULET power plant in accordance with the present approach may provide a Primary Response or Primary Frequency Response (PFR) to respond to transient frequency events in the electrical grid. For example, in the event of a reduction in the frequency of the grid system, the PFR may generally involve a power plant rapidly picking up a corresponding portion of its baseload output in order to counteract the reduction in grid frequency.

For non-stoichiometric gas turbine systems operating in a fuel-lean mode, excess oxidant may be present in the combustors throughout operation. As such, the fuel flow rate to the combustors of the gas turbine system may be quickly adjusted to increase the mechanical and electrical power output of the system upon detection of a transient event (e.g., an under-voltage or under-frequency event). In contrast, for the disclosed SEGR gas turbine system 52, the oxidant and fuel may be balanced in a substantially stoichiometric ratio during a substantial portion of its operation. Accordingly, for the SEGR gas turbine system 52, both the amount of oxidant and fuel may be increased in order to increase the electrical and mechanical power output to support the grid during the transient event. For certain embodiments of the SEGR gas turbine system 52, in general, air flow adjustments may be generally affected at a slower rate than fuel flow adjustments. For such embodiments, this effect may be due to the slower response capability of certain air flow effectors (e.g., inlet guide vanes and/or stator vanes) when compared to the response capability of certain fuel flow effectors (e.g., control valves). It may be appreciated that increasing the fuel flow rate in a SEGR gas turbine system 52 without increasing the oxidant may drive the equivalence ratio ($\Phi$) to a fuel-rich mode that may suppress the flame temperature, which may actually reduce the mechanical power produced by the turbine section 156. Accordingly, for certain embodiments discussed below, the fuel flow rate changes may typically follow or track oxidant flow rate changes made to address the transient event.

With the foregoing in mind, set forth below are five different example embodiments (Examples 1, 2, 3, 4, and 5) describing methods for controlling operation of a SEGR gas turbine system 52 (e.g., a ULET power plant) in order to allow the system to respond to transient events in the electrical grid (e.g., provide PFR for the electrical grid). It may be appreciated that one or more of the embodiments described below may be used alone or in various combinations with one another to address a transient event. Generally speaking, certain embodiments discussed below are directed towards quickly increasing an oxidant concentration, as well as the fuel concentration, in the combustors of the SEGR gas turbine system 52 in order to increase mechanical and electrical power output to address the transient event. Other embodiments discussed below are directed towards temporarily decreasing electrical power consumption within the ULET power plant to effectively increase net electrical power output in order to address the transient event. Still other embodiments discussed below enable the SEGR gas turbine system 52 to address transient events when operating in a non-stoichiometric mode (e.g., a non-emissions compliant mode) during loading.

Figure 5:
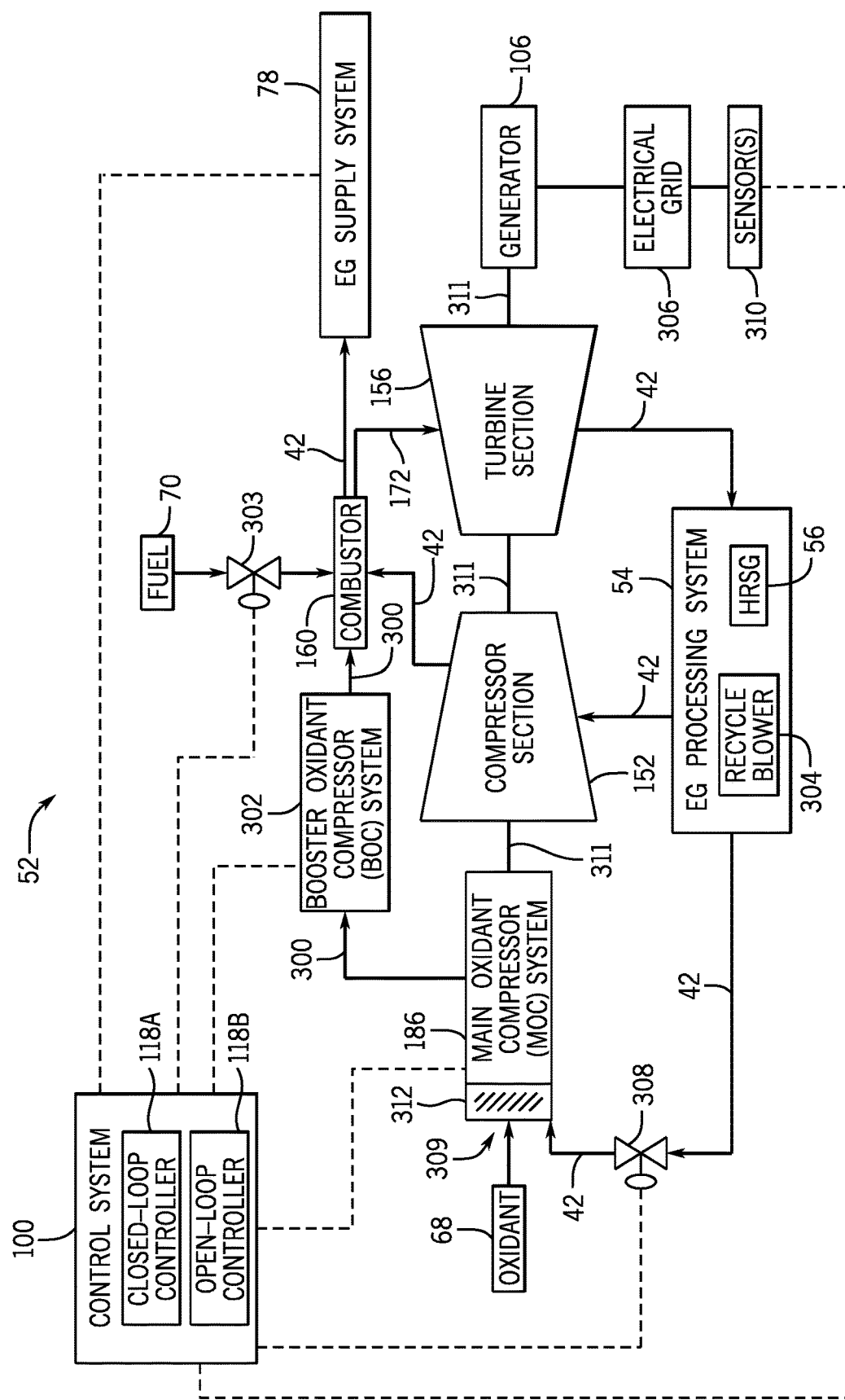
FIG. 5 is a schematic illustrating portions of an embodiment of a gas turbine system, such as a ultra-low emission technology (ULET) power plant, in accordance with embodiments of the present approach.

FIG. 5 generally illustrates an embodiment of control strategies that are set forth in detail below with respect to Examples 1-5. FIG. 5 is a schematic of a SEGR gas turbine system 52 (e.g., a ULET power plant), in accordance with embodiments of the present technique. The SEGR gas turbine system 52 illustrated in FIG. 5 includes a main oxidant compressor system (MOC) 186 that receives a flow of oxidant 68 (e.g., air, oxygen, enriched air, or oxygen-reduced air) and an exhaust gas recirculation (EGR) flow 42, and outputs a compressed oxidant flow 300. In certain embodiments, the compressed oxidant flow 300 may be directed through a booster oxidant compressor system (BOC) 302 for further compression before reaching the combustor 160, as discussed below. In other embodiments, the BOC 302 may not be present. The illustrated combustor 160 receives the compressed oxidant flow 300, as well as a flow of fuel 70 traversing a modulating control valve 303 (e.g., a hydraulically-actuated control valve 303) and a flow of compressed exhaust gas 42 from the compressor section 152, and yields an oxidant/fuel mixture that is combusted to form a high-pressure exhaust gas 172 (i.e., combustion gas or combustion products), which is subsequently routed to the turbine section 156. In certain embodiments, a portion of the flow of compressed exhaust gas 42 received by the combustor 160 from the compressor section 152 may be passed along portions of the combustor 160 (e.g., through one or more manifolds or shrouds of the combustor 160) to cool the outer surfaces of the combustion hardware. As illustrated in FIG. 5, after traversing and cooling the manifolds or shrouds of the combustor 160, this flow of compressed exhaust gas 42 may subsequently be routed to the EG supply system 78 for later use by other systems (e.g., the hydrocarbon production system 12 discussed above).

The turbine section 156 illustrated in FIG. 5 generates mechanical power by expanding the high-pressure exhaust gas 172, and this mechanical power may be used to drive various portions of the SEGR gas turbine system 52, including, for example, the MOC 186, the compressor section 152, and the electrical generator 106. After exiting the turbine section 156, the exhaust gas 42 may be provided to the illustrated EG processing system 54. As set forth above, the EG processing system 54 may include a HRSG 56 and a recycle blower 304 (also referred to as a booster blower or an EGR blower), among other components. After being processed by the EG processing system 54, a portion of the exhaust gas 42 may be routed to the inlet or intake of the compressor section 152, while another portion of the exhaust gas 42 may be routed through the modulating control valve 308 and into the inlet or intake 309 of the MOC 186. The path that the exhaust gas 42 takes from the turbine section 156 to the compressor section 152, including the EG processing system 54, may be generally referred to as the exhaust gas return (EGR) loop 305. Further, the electrical power produced by the generator 106 may be supplied to the electrical grid 306.

Additionally, the illustrated SEGR gas turbine system 52 includes a controller system 100 that is communicatively coupled to and controls various components of the SEGR gas turbine system 52. In general, the control system 100 may receive operational data from and/or provide control signals to these components according to the control strategies described below. The control system 100 includes a closed-loop controller 118A capable of implementing a closed-loop control strategy in which control signals are generated based on the operational parameters of one or more components of the SEGR gas turbine system 52 to provide feedback-based control of the various components of the SEGR gas turbine system 52. The control system 100 also includes an open-loop controller 118B, implemented in parallel with the closed-loop controller 118A, and capable of implementing an open-loop control strategy in which control signals are generated not based on the operational parameters of the one or more components, but rather are based on other factors (e.g., the determination of a transient event occurrence or the passage of a certain amount of time). In certain embodiments, the open-loop and closed-loop control strategies may be implemented in a single controller that may coordinate operations (e.g., properly assume and relinquish control of portions of the SEGR gas turbine system 52) according to the methods set forth below. Additionally, the controller system 100 may be communicatively coupled to one or more sensors 310 that perform measurements of the electrical grid 306 and facilitate the detection of transient events (e.g., under voltage or under frequency events) in the electrical grid 306. In other embodiments, the controller system 100 may determine the occurrence of a transient event based on instructions from a controller or control system of the electrical grid 306.

In certain example embodiments presented below, the control system 100 may temporarily relax (e.g., increase) one or more programmed operational limits of the SEGR gas turbine system 52 while responding to the transient event in the electrical grid 306. For example, in certain embodiments, in addition or alternative to examples set forth below, the controller 100 may temporarily increase a programmed torque limit constraint of a component (e.g., the turbine section 156 or a shaft 311 coupled thereto) of the SEGR gas turbine system 52 to allow the turbine section 156 to temporarily increase mechanical power output, allowing the generator 106 to temporarily increase electrical power output, to support the electrical grid 306 during a transient event. In other embodiments, the relaxed constraint may include a torque limit, a speed limit, a pressure limit, a flow rate limit, a voltage limit, a current limit, a power limit, or another suitable constraint of the SEGR gas turbine system 52.

Example 1. Limiting EGR Flow to the MOC 186 to Increase Oxidant Availability in the Combustors 160

In certain embodiments, the SEGR gas turbine system 52 illustrated in FIG. 5 (e.g., a ULET power plant) may be operating at or near a stoichiometric ratio (i.e., $\Phi$ between approximately 0.95 and 1.05). In this example embodiment, the SEGR gas turbine system 52 includes the aforementioned modulating control valve 308 that regulates the flow of the exhaust gas 42 from the recycle blower 304 to the inlet of the MOC 186. The controllers 118A and 118B respectively may implement (e.g., in parallel) the closed-loop and open-loop control strategies for controlling the flow rate of exhaust gas 42 through the control valve 308, wherein the controller 118A or 118B that dictates the lesser value (i.e., the lower flow rate though control valve 308) prevails and provides the appropriate control signal.

For this example, the closed-loop control strategy of the controller 118A may dictate that the flow rate of exhaust gas 42 through the control valve 308 is to be a fixed percentage (e.g., 99%, 95%, 90%, 85%, 70%, 75%, or another suitable fixed percentage) of the total flow rate of both exhaust gas 42 and oxidant 68 delivered to the inlet 309 of the MOC 186. Meanwhile, the parallel open-loop control strategy of the controller 118B may dictate a fully open position for the control valve 308 during normal operation of the SEGR gas turbine system 52, but may dictate a fully closed position (e.g., immediately or after a programmable time delay) for the control valve 308 upon determining that a transient event is occurring in the electrical grid 306. When the control valve 308 is in the fully closed position, little to no exhaust gas 42 is delivered to the inlet 309 of the MOC 186. This results in the MOC 186 receiving more oxidant 68 (e.g., more fresh air flow or more oxygen flow), which increases abundance of the oxidant 68 in the combustor 160. Whenever the control system 100 detects this increase in oxidant, the closed-loop controller 118A may increase the flow of fuel 70 through the control valve 303 in a commensurate manner to maintain the equivalence ratio near approximately 1 (e.g., $\Phi$ between approximately 0.95 and 1.05) throughout the response to the transient event. Accordingly, the increased amount of both oxidant 68 and fuel 70 being delivered to and consumed by the combustor 160 results in an increase in mechanical power output for the SEGR gas turbine system 52, as well as an increase in electrical power output of the generator 106 to the electrical grid 306 to accommodate the transient event, while still maintaining an equivalence ratio near approximately 1 (e.g., $\Phi$ between approximately 0.95 and 1.05).

Accordingly, throughout operation of the SEGR gas turbine system 52, the controller 118A may determine a desired position for the control valve 308 that provides a desired flow rate of exhaust gas 42 to the inlet 309 of the MOC 186, as dictated by the closed-loop control strategy. In particular, the controller 118A may determine that the closed-loop control strategy dictates a particular position for the control valve 308 that provides a flow rate of exhaust gas 42 through the control valve 308 that is a fixed percentage (e.g., 70%, 80%, 90%, 95%, 98%, or another suitable value) of the total flow rate of both oxidant 68 and exhaust gas 42 delivered to the inlet of the MOC 186. Additionally, during normal operation of the SEGR gas turbine system 52 (i.e., no transient grid events occurring), the controller 118B may determine that the control valve 308 should be fully or mostly opened to provide the maximum flow rate of exhaust gas 42 to the inlet 309 of the MOC 186, as dictated by the open-loop control strategy. As such, during normal operations of the SEGR gas turbine system 52, since the closed-loop control strategy used by the controller 118A will generally dictate the more closed position for (i.e., the lower flow rate though) control valve 308, the controller 118A prevails, invoking the control system 100 to send the appropriate control signals to the control valve 308 based on the position dictated by the controller 118A.

However, when a transient event is determined to be occurring in the electrical grid (e.g., by the sensors 310), the controller 118B may determine that the control valve 308 should be fully or mostly closed to provide little or no exhaust gas 42 to the inlet 309 of the MOC 186, as dictated by the open-loop control strategy. Here, since the open-loop control strategy used by the controller 118B generally dictates a more closed position for (i.e., the lower flow rate though) control valve 308 than the closed-loop control strategy used by controller 118A, the controller 118B prevails, invoking the control system 100 to send the appropriate control signals to the control valve 308 based on the position dictated by the controller 118B. In certain embodiments, the control system 100 may send the control signals to the control valve 308 immediately or after a programmable or predetermined time delay. Then, control valve 308 may remain in the fully closed position for a programmable or predetermined time delay (e.g., based on the typical length of time of a transient event on the electrical grid 306), after which the open-loop control strategy may dictate that the control valve 308 should gradual return to a fully open position over a period of time (e.g., at a programmable or predetermined ramp rate). Accordingly, at some point during this ramp, the closed-loop control strategy should dictate a more closed position for (i.e., the lower flow rate though) control valve 308 than the open-loop strategy of controller 118B, resulting in the control system 100 once again providing control signals to the control valve 308 based on the position desired by the controller 118A.

Example 2. Adjusting Operational Parameters of the MOC 186 to Increase Oxidant Availability in the Combustors 160

In certain embodiments, the SEGR gas turbine system 52 illustrated in FIG. 5 (e.g., a ULET power plant) may be operating at or near a stoichiometric ratio (i.e., $\Phi$ between approximately 0.95 and 1.05). As mentioned above, the MOC 186 of the SEGR gas turbine system 52 may include a plurality of IGVs 312 that regulates the flow of the exhaust gas 42 and the oxidant 68 into the inlet 309 of the MOC 186. The controllers 118A and 118B may respectively implement (e.g., in parallel) a closed-loop and an open-loop control strategy for controlling the position of the MOC IGVs 312, wherein the controller 118A or 118B that dictates the higher IGV angle (i.e., the more open MOC IGV position) prevails.

For this example, the closed-loop control strategy of the controller 118A may dictate an MOC IGV angle or position that is based on the current operational parameters of the SEGR gas turbine system 52. For example, this closed-loop control strategy may generally seek to limit the amount of oxidant being delivered to the combustor 160 to maintain substantially stoichiometric combustion in the system 52. During normal operation of the SEGR gas turbine system 52, the open-loop control strategy of the controller 118B may dictate an MOC IGV position that is substantially the same as the closed-loop control strategy of controller 118A. However, upon detection of a transient event in the electrical grid 306, the controller 118B may dictate a MOC IGV position (e.g., immediately or after a programmable time delay) that is a programmable fixed percentage greater (more open) (e.g., 1%, 2%, 3%, 4%, 5%, 6%, 7%, 8%, 9%, or 10% greater) than the IGV position dictated by the closed-loop control strategy of controller 118A. As a result, the total flow of oxidant 68 entering the inlet 309 of the MOC 186 will increase, resulting in an increase in the abundance of the oxidant 68 in the combustor 160. Whenever the control system 100 detects this increase in oxidant, the closed-loop controller 118A may cause the control system 100 to increase the flow of fuel 70 through the control valve 303 in a commensurate manner to maintain the equivalence ratio near approximately 1 (e.g., $\Phi$ between approximately 0.95 and 1.05) throughout the response to the transient event. Accordingly, the increased amount of both oxidant 68 and fuel 70 being delivered to (and consumed by) the combustor 160 results in an increase in mechanical power output for the SEGR gas turbine system 52, as well as an increase in electrical power output of the generator 106 to the electrical grid 306 to accommodate the transient event, while still maintaining an equivalence ratio near approximately 1 (e.g., $\Phi$ between approximately 0.95 and 1.05).

Accordingly, throughout operation of the SEGR gas turbine system 52, the controller 118A may determine a desired MOC IGV position as dictated by the closed-loop control strategy based on the operational demands of the SEGR gas turbine system 52. Additionally, during normal operation of the SEGR gas turbine system 52 (i.e., no transient grid events), the open-loop control strategy of the controller 118B may dictate the same desired MOC IGV position as is dictated by the closed-loop control strategy of controller 118A. However, when a transient event is determined to be occurring in the electrical grid (e.g., via the sensors 310), the controller 118B may determine that the MOC IGV position should be a programmable or predetermined amount (e.g., 5%, 10%, or 15%) more open than the MOC IGV position dictated by the closed-loop control strategy of controller 118A. Here, since the open-loop control strategy used by the controller 118B generally dictates a more open position for (e.g., a higher angle) the IGVs than the closed-loop control strategy used by controller 118A, the controller 118B prevails, invoking the control system 100 to send the appropriate control signals to the MOC IGVs 312 based on the position dictated by the controller 118B. In certain embodiments, the control system 100 may send the control signals to IGVs 312 immediately or after a programmable or predetermined time delay. Subsequently, the MOC IGVs 312 may remain in the more open position dictated by the controller 118B for a programmable or predetermined time delay (e.g., based on the typical length of time of a transient event on the electrical grid 306), after which the open-loop control strategy may dictate that the MOC IGVs 312 gradually return to the position dictated by the closed-loop strategy of controller 118A over a period of time (e.g., at programmable or predetermined ramp rate). Accordingly, at some point during this ramp, the open-loop control strategy of controller 118B will dictate the same MOC IGV position as the closed-loop control strategy of controller 118A, effectively handing MOC IGV control back over to the controller 118A.

Example 3. Adjusting Operational Parameters of the BOC System 302 to Increase Oxidant Availability in the Combustors 160

Figure 6:
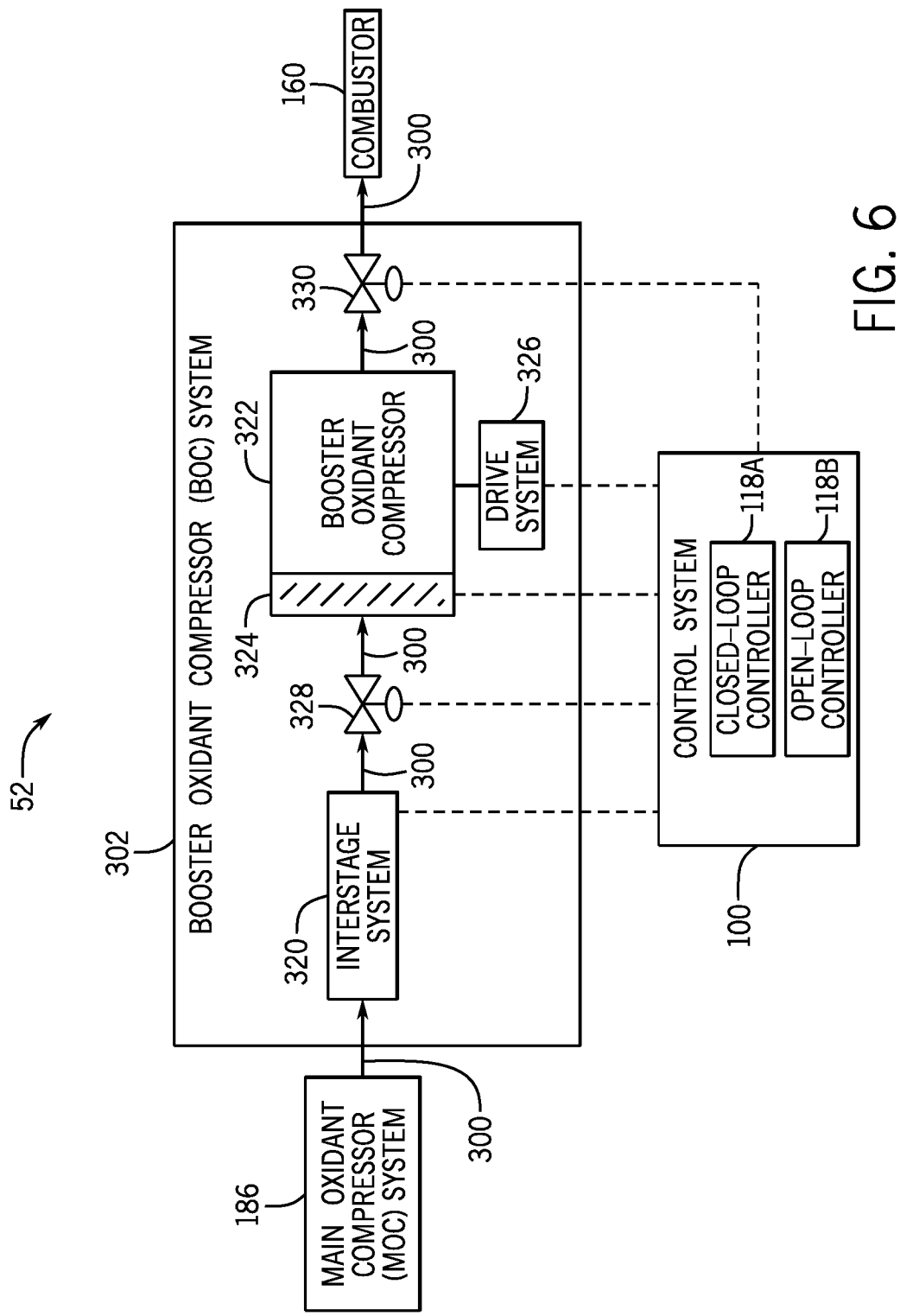
FIG. 6 is a schematic of the gas turbine system of FIG. 5, illustrating an embodiment of a booster oxidant compressor (BOC) system.

In certain embodiments, the SEGR gas turbine system 52 illustrated in FIG. 5 (e.g., a ULET power plant) may be operating at or near a stoichiometric ratio (i.e., $\Phi$ between approximately 0.95 and 1.05). As mentioned above, in certain embodiments, the SEGR gas turbine system 52 may include a booster oxidant compressors (BOC) system 302 that may work in series with the MOC 186 to produce the compressed oxidant flow 300 for delivery to the combustor 160. FIG. 6 illustrates components of a BOC 302 in accordance with an embodiment of the present approach. The BOC 302 illustrated in FIG. 6 includes an interstage system 320 (also referred to herein as an interstage cooling system 320), as-well as a booster oxidant compressor 322 that has a number of BOC inlet guide vanes (IGVs) 324 and is powered by a drive system 326. In certain embodiments, the interstage cooling system 320 may be positioned between the compression stages of the MOC 186 and the BOC 302 and may include a heat exchanging device that dissipates heat (e.g., act as an intercooler) between the compression stages of the MOC 186 and the BOC 302. The interstage cooling system 320 may be controlled by modify the heat duty of the included heat exchanging device (e.g., via an increase or a decrease in a coolant flow received by the interstage cooling system 320), which may affect the density of the compressed oxidant flow 300 arriving at the IGVs 324 of the booster oxidant compressor 322. In other embodiments, the interstage cooling system 320 may be separate from the BOC 302 (e.g., not be grouped in with the components of the BOC 302), or may not be present at all, without negating the effect of the present approach.

Furthermore, as illustrated in FIG. 6, the SEGR gas turbine system 52 includes the control system 100, which includes the closed-loop controller 118A and the open-loop controller 118B introduced above. The control system 100 is communicatively coupled to receive operational information from and/or provide control signals to the components of the BOC 302 during operation of the SEGR gas turbine system 52. For example, the control system 100 may provide control signals to affect operational parameters of the BOC 302, such as the position or angle of the BOC IGVs 324, a speed of the drive system 326 and/or the compressor 322, and/or the position of (or flow rate provided by) various modulating control valves (e.g., inlet throttle valve 328, discharge throttle valves 330, one or more recycle valves (not shown), or any other suitable control valves) that may be present in the BOC 302. Additionally, in certain embodiments, the control system 100 may provide control signals to affect operational parameters of the interstage cooling system 320, for example, by increasing or decreasing a coolant flow in the interstage cooling system 320, which may increase or decrease the density of the compressed oxidant flow 300 exiting the interstage cooling system 320. For example, in such embodiments, as the interstage cooling system 320 increases the density of the compressed oxidant flow 300 based on signals from the control system 100, the total flow (e.g., the volume per unit time) of compressed oxidant flow 300 also increases, as does the amount of oxidant per unit time delivered to the combustor 160 (e.g., a greater oxidant flow). It may be appreciated that the aforementioned operational parameters of the BOC 302 are merely provided for example, and any setting or parameter that affects the performance or output of the BOC 302 may be modulated in accordance with the present technique. The controllers 118A and 118B may respectively implement (e.g., in parallel) closed-loop and open-loop control strategies for controlling the operational parameters of the components of the BOC 302, wherein the controller 118A or 118B that dictates the higher BOC performance setting (e.g., the setting that results in the higher rate of oxidant flow 300 through the BOC 302) prevails.

For this example, the closed-loop control strategy of the controller 118A may dictate values for the operational parameters (e.g., position of the BOC IGVs, speed of the compressor 322 and/or the drive system 326, oxidant flow rate provided by the positions of control valves 328 and 330, a coolant flow rate for the heat exchanging device of the interstage cooling system 320, and so forth) of the components of the BOC 302 based on the current operation of the SEGR gas turbine system 52. During normal operation of the SEGR gas turbine system 52 (i.e., no transient events detected in the electrical grid 306), the open-loop control strategy of the controller 118B may dictate values for the operational parameters of the BOC 302 that are the same as those dictated by the closed-loop control strategy of controller 118A. However, upon detection of a transient event in the electrical grid 306, the controller 118B may dictate values for the operational parameters for the BOC 302 (e.g., immediately or after a programmable or predetermined time delay) that are a programmable or predetermined amount or percentage greater (e.g., providing 1%, 2%, 3%, 4%, 5%, 6%, 7%, 8%, 9%, or 10% greater oxidant flow 300) than the values dictated by the closed-loop control strategy of controller 118A. As a result of this higher oxidant flow dictated by the open-loop controller 118B, the abundance of the oxidant 68 in the combustor 160 also increases. As illustrated in FIG. 5, whenever the control system 100 detects this increase in oxidant, the closed-loop controller 118A may cause the control system 100 to increase the flow of fuel 70 through the control valve 303 in a commensurate manner to maintain the equivalence ratio near approximately 1 (e.g., $\Phi$ between approximately 0.95 and 1.05) throughout the response to the transient event. Accordingly, the increased amount of both oxidant 68 and fuel 70 being delivered to and consumed by the combustor 160 results in an increase in mechanical power output for the SEGR gas turbine system 52, as well as an increase in electrical power output of the generator 106 to the electrical grid 306 to accommodate the transient event, while still maintaining the equivalence ratio near approximately 1 (e.g., $\Phi$ between approximately 0.95 and 1.05).

Accordingly, throughout operation of the SEGR gas turbine system 52, the controller 118A may determine values for the operational parameters of the BOC 302 (e.g., position of the BOC IGVs 324, speed of the compressor 322 and/or the drive system 326, oxidant flow rate provided by the positions of control valves 328 and 330, and so forth) as dictated by the closed-loop control strategy based on the operational demands of the SEGR gas turbine system 52. Additionally, during normal operation of the SEGR gas turbine system 52 (i.e., no transient grid events), the open-loop control strategy of the controller 118B may dictate desired values for the operational parameters of the BOC 302 that are the same as those dictated by the closed-loop control strategy of controller 118A. However, when a transient event is determined to be occurring in the electrical grid (e.g., via the sensors 310), the controller 118B may determine that the values for the operational parameters of the BOC 302 should be a programmable or predetermined amount (e.g., 5%, 10%, 15%, or 20%) higher (e.g., more open position for the BOC IGVs 324, a faster speed for the compressor 322 and/or the drive system 326, a higher oxidant flow rate through the control valves 328 and 330, a higher density compressed oxidant flow 300 through the interstage cooling system 320, etc.) than the values dictated by the closed-loop control strategy of controller 118A.

For example, during a transient event, when the open-loop control strategy used by the controller 118B generally dictates a more open position (e.g., a higher angle) for the BOC IGVs 324 than the position dictated by the closed-loop control strategy used by controller 118A, the controller 118B prevails, invoking the control system 100 to send the appropriate control signals to the BOC IGVs 324 based on the position dictated by the controller 118B. In certain embodiments, the control system 100 may send the control signals to BOC 302 immediately (e.g., at the time of the transient event) or after a programmable or predetermined time delay. Subsequently, the BOC 302 may remain in the higher performance state dictated by the controller 118B for a programmable or predetermined time delay (e.g., based on the typical length of time of a transient event on the electrical grid 306), after which the open-loop control strategy may dictate that the values for the operational parameters of the BOC 302 should gradually return to the values dictated by the closed-loop strategy of controller 118A over a period of time (e.g., at a programmable or predetermined ramp rate). Accordingly, at some point during this ramp, the open-loop control strategy of controller 118B should dictate the same operational parameter values as the closed-loop control strategy of controller 118A, effectively handing control of the BOC 302 back over to the controller 118A.

Figure 7:
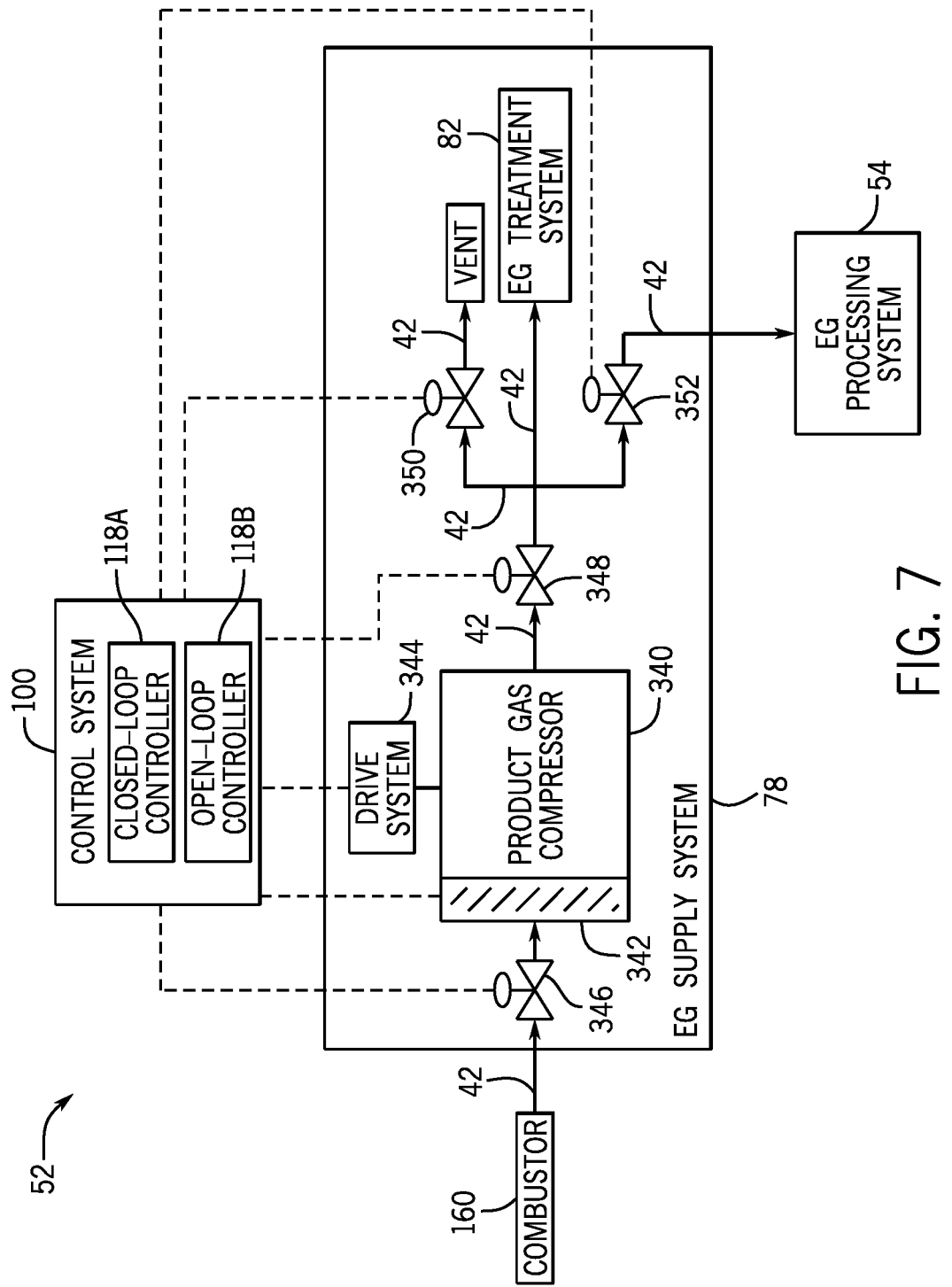
FIG. 7 is a schematic of the gas turbine system of FIG. 5, illustrating an embodiment of an exhaust gas (EG) supply system.

Example 4. Decrease Electrical Power Consumption in the SEGR Gas Turbine System 52 to Increase Electrical Power Output In certain embodiments, the SEGR gas turbine system 52 illustrated in FIG. 5 (e.g., a ULET power plant) may be operating at or near a stoichiometric ratio (i.e., Φ between approximately 0.95 and 1.05) or may be operating at a non-stoichiometric ratio (e.g., in a non-emissions compliant mode, as discussed below). Additionally, the SEGR gas turbine system 52 may include an EG supply system 78, which may receive and process a portion of the exhaust gas flow 42 (e.g., a relatively high-pressure exhaust gas flow 42) for use in other portions of the system (e.g., hydrocarbon production system 12). FIG. 7 illustrates a portion of an embodiment of the SEGR gas turbine system 52 and, more specifically, illustrates components of an EG supply system 78. As such, FIG. 7 includes the combustor 160 and the EG processing system 54 discussed above. Additionally, the EG supply system 78 illustrated in FIG. 7 is coupled to a portion of the combustor 160 to receive the exhaust gas flow 42 (e.g., the cooling exhaust gas flow 42 discussed above) after it traverses at least a portion (e.g., a manifold or shroud) of the combustor 160.

Additionally, as illustrated in FIG. 7, the control system 100 may be communicatively coupled to various portions of the EG supply system 78 to receive operational information from and/or provide control signals to these components based upon closed-loop and open-loop control strategies respectively implemented in parallel using the closed-loop controller 118A and the open-loop controller 118B. In particular, for the illustrated embodiment, the control system 100 is communicatively coupled to one or more components associated with the operation of a product gas compressor 340. For example, as illustrated in FIG. 7, the control system 100 may provide control signals to control the position of the inlet guide vanes (IGVs) 342 of the product gas compressor 340, to control the speed of the drive system 344 that powers the product gas compressor 340, and/or to control the position of (the flow rate of the exhaust gas 42 through) an inlet throttle valve 346 and discharge throttle valve 348, as well as any other suitable control valves (e.g., recycle valves, not shown) that may be associated with the operation of the product gas compressor 340. It may be appreciated that the foregoing list of operational parameters of the product gas compressor 340 is merely provided for example, and any setting or parameter that affects the performance or output of the product gas compressor 340 and/or the EG supply system 78 may be controlled in accordance with the present technique.

Additionally, the control system 100 may provide control signals to modulate the position of and/or the flow rate of exhaust gas 42 through the product gas vent valve 350 and the product gas recycle valve 352. As illustrated in FIG. 7, the product gas vent valve 350 may generally regulate a flow of exhaust gas 42 being vented from the EG system of the SEGR gas turbine system 52 (e.g., to the atmosphere), while the product gas recycle valve 352 may generally regulate a flow of exhaust gas 42 that may be returned to the EG processing system 54 or any portion of the EGR loop 305. When the product gas vent valve 350 and the product gas recycle valve 352 are both in fully closed positions, the total flow of exhaust gas 42 exiting the product gas compressor 340 may be directed to the EG treatment system 82 for further purification, storage, and/or use.

With the foregoing in mind, during normal operation of the SEGR gas turbine system 52 (e.g., no transient event in the electrical grid 306), the closed-loop controller 118A of the control system 100 may provide control signals to the various components of the EG supply system 78 to generally maintain a desired pressure in the EGR loop 305 based on the operation of the SEGR gas turbine system 52. For example, in certain embodiments, the closed-loop controller 118A may provide control signals to modulate the performance parameters (e.g., position of the IGVs 342, positions of the control valves 346 and 348, speed of the drive system 344, and so forth) of the product gas compressor 340 to increase or decrease the pressure of the exhaust gas 42 provided to the EG processing system 54 of the SEGR gas turbine system 52. In addition or in alternative to the performance parameters of the product gas compressor 340, in certain embodiments, the closed-loop controller 118A may provide control signals to open the product gas vent valve 350 to decrease the amount of the exhaust gas 42 delivered to the EG processing system 54 (e.g., decreasing pressure in the EG loop 305) and/or provide control signals to open the product gas recycle valve 352 to increase the amount of the exhaust gas 42 delivered to the EG processing system 54 (e.g., increasing pressure in the EG loop 305). In certain embodiments, the position of the control valves 350 and 352 may be modulated more quickly than the performance parameters of the product gas compressor 340 and may, therefore, provide more responsive control of the SEGR gas turbine system 52. Further, the closed-loop controller 118A may generally seek to maintain the product gas vent valve 350 and the product gas recycle valve 352 in substantially closed positions in order to ensure efficient operation (e.g., avoid unnecessary operation and power consumption) of the product gas compressor 340.

As mentioned, the control system 100 includes an open-loop controller 118B implemented in parallel with the closed-loop controller 118A, and the controller that dictates the lower performance parameter values for the product gas compressor 340 prevails. During normal operations of the SEGR gas turbine system 52 (e.g., no transient event in the electrical grid 306), the open-loop control strategy utilized by the open-loop controller 118B may generally dictate values for the performance parameters (e.g., position of the IGVs 342, positions of the control valves 346 and 348, speed of the drive system 344, or another suitable performance parameter) for the product gas compressor 340 that are substantially the same as the values dictated by the closed-loop control strategy of the closed-loop controller 118A.

However, upon detection of a transient event in the electrical grid 306, the open-loop controller 118B may dictate (e.g., immediately or after a programmable or pre-determined time delay) the implementation of performance parameter values for the product gas compressor 340 that are a programmable or predetermined amount (e.g., a fixed percentage) less than the performance parameter values currently dictated by the closed-loop controller 118A (e.g., a more closed position for the IGVs 342, a slower speed for the drive system 344, etc.). For example, upon detection of a transient event, the open-loop controller 118B may dictate that the speed of the drive system 344 (which determines the speed of the product gas compressor 340) should be set to a value that is a fixed percentage (e.g., 2%, 5%, 10%, 15%, 20%, or another suitable percentage) less than the speed of the drive system 344 dictated by the closed-loop controller 118A. Accordingly, since the open-loop controller 118B dictates a lesser value for the performance parameter of the product gas compressor 340 than the closed-loop controller 118A, the open-loop controller 118B prevails, and the control system 100 provides the appropriate control signals to modulate the value of performance parameter of the product gas compressor 340 based on the dictates of the controller 118B.

It may be appreciated that temporarily reducing the values of the performance parameters of the product gas compressor 340 (e.g., using a more closed position for the IGVs 342, using a slower speed for the drive system 344, using a lower flow rate through the control valves 346 and 348, etc.) may result in the product gas compressor 340, as well as the SEGR gas turbine system 52 as a whole, consuming less electrical power. In certain embodiments, the SEGR gas turbine system 52 may consume at least a portion of the electrical power generated (e.g., by the generator 106 illustrated in FIG. 5) internally or locally, and may export the remaining electrical power to the electrical grid 306. As such, in certain embodiments, temporarily reducing electrical power consumption within the SEGR gas turbine system 52 without substantially affecting the electrical power generated enables the SEGR gas turbine system 52 to temporarily export additional electrical energy to the electrical grid 306 during a transient event. While adjusting the performance parameters of the product gas compressor 340 is presently provided as an example, in other embodiments, the performance parameters of other components or systems (e.g., pumps, compressors, fans, blowers, and so forth) that are disposed downstream of the EG processing system 54 and/or the EGR loop 305 may be additionally or alternatively modulated to temporarily reduce internal power consumption of the SEGR gas turbine system 52, in accordance with an embodiment of the present approach.

As such, when the open-loop controller 118B reduces the values of the performance parameters of the product gas compressor 340 by the programmable or predetermined amount (e.g., a fixed percentage) upon determining that a transient event is occurring or after a programmable delay time, the SEGR gas turbine system 52 may have additional electrical power available to support the electrical grid 306 during the transient event. In certain embodiments, while the open-loop controller 118B is in control of the performance parameters of the product gas compressor 340, the closed-loop controller 118A may continue to provide closed-loop control over the pressure of exhaust gas 42 in the EGR loop 305 by modulating the positions of the product gas vent control valve 350 and the product gas recycle control valve 352 to control the flow of exhaust gas 42 being delivered to the EG processing system 54. After a programmable delay time (e.g., a lifetime of a typical transient event in the electrical grid 306), the open-loop controller 118B may, at a programmable or predetermined ramp rate, gradually restore the values of the performance parameters of the product gas compressor 342 the values currently dictated by the closed-loop controller 118A, effectively handing control back over to the closed-loop controller 118A.

Example 5. Handling Transient Events in the Electrical Grid while Ramping Up Load in the SEGR Gas Turbine System 52

For Examples 1-4 discussed above, the SEGR gas turbine system 52 illustrated in FIG. 5 (e.g., a ULET power plant) may be initially operating at or near a stoichiometric ratio (i.e., Φ between approximately 0.95 and 1.05) when the transient event in the electrical grid 306 is detected. However, it may be appreciated that the SEGR gas turbine system 52 may also encounter transient events in the electrical grid 306 as the SEGR gas turbine system 52 is being loaded (e.g., during startup of the SEGR gas turbine system 52). Accordingly, Example 5 is another embodiment of the present approach that enables the SEGR gas turbine system 52 illustrated in FIG. 5 (e.g., a ULET power plant) to respond to a transient event in the electrical grid 306 while operating in a non-emissions compliant mode (e.g., during fuel-lean combustion) during system loading.

As discussed below, it is envisioned that the SEGR gas turbine system 52 (e.g., the ULET power plant) may be operated in two distinct modes: an emissions compliant mode in which the compressed oxidant stream and the fuel stream are coordinated to achieve a substantially stoichiometric ratio within the combustors 160, and a non-emissions compliant mode in which the compressed oxidant and fuel streams are coordinated so as to achieve fuel-lean combustion (e.g., a fuel-to-oxidant ratio less than that of stoichiometric combustion) within the combustors 160. As set forth below, embodiments of the present approach enable a further increase in oxidant abundance during loading, allowing the SEGR gas turbine system 52 to temporarily increase mechanical and electrical power output in order to respond to a transient event in the electrical grid 306 during loading.

With the foregoing in mind, FIG. 8 is a graph 400 of equivalence ratio (θ) versus load for the SEGR gas turbine system 52. In particular, the graph 400 illustrates two loading profiles: a normal loading profile 402 and a modified loading profile 404 that enables the SEGR gas turbine system 52 to be substantially better at handling transient events in the electrical grid 306 during loading. Furthermore, the graph 400 includes several regions that denote different modes of operation for the SEGR gas turbine system 52. These regions include a non-emissions compliant region (without primary frequency response (PFR)) 406, a non-emissions compliant region (with PFR) 408, a non-emissions compliant transfer region (without PFR) 410, and an emissions compliant region (with PFR) 412. In general, the control system 100 may control the SEGR gas turbine system 52 to eventually operate at or near a stoichiometric ratio (i.e., Φ is approximately 1), as illustrated by the loading profiles 402 and 404 in the region 412. However, as discussed below, the loading profiles 402 and 404 differ in the regions 406, 408 410, before the SEGR gas turbine system 52 is operating at or near the stoichiometric ratio.

For the normal loading profile 402 of the SEGR gas turbine system 52, the equivalence ratio may steadily increase throughout regions 406, 408, and 410 such that the SEGR gas turbine system 52 may be operating at or near the stoichiometric ratio in the emissions compliant region (with PFR) 412. Across the non-emissions compliant region (with PFR) 408, the SEGR gas turbine system 52 may still address transient events (e.g., under frequency events) in the electrical grid 306. As discussed above, providing additional oxidant (as well as additional fuel) to the combustors 160 of the SEGR gas turbine system 52 during a transient event in the electrical grid 306 enables the SEGR gas turbine system 52 to quickly increase electrical power output to address the transient event. However, for the loading profile 402 illustrated in FIG. 8, a goal may be to ramp the SEGR gas turbine system 52 up to the stoichiometric ratio as quickly as possible.

In contrast, the loading profile 404 illustrated in FIG. 8 represents a compromise between the goals of bringing the SEGR gas turbine system 52 up to the stoichiometric ratio and improving the ability of the SEGR gas turbine system 52 to handle transient events in the electrical grid 306 over the non-emissions compliant region (with PFR) 408. As such, the loading profile 404 maintains a lower equivalence ratio (Φ) than (e.g., a depressed equivalence ratio relative to) the normal loading profile 402 across the regions 406 and 408. For example, in certain embodiments, the loading profile 404 may maintain an equivalence ratio (Φ) between approximately 0.3 and approximately 0.7, between approximately 0.4 and approximately 0.6, between approximately 0.45 and approximately 0.55, or approximately 0.5 across the regions 406 and 408. That is, instead of providing the highest equivalence ratio possible in a given load during the loading process, the loading profile 404 maintains a substantially low equivalence ratio (e.g., Φ is held at a minimum value) throughout the regions 406 and 408, meaning that the SEGR gas turbine system 52 may generally maintain higher oxidant abundance over these regions so as to enable the ULET power plant to have the maximum possible capability to respond to transient events in the electrical grid 306. Accordingly, as set forth above, higher oxidant abundance in the SEGR gas turbine system 52 (e.g., in the combustors 160 and in the EGR loop 305) generally allows the SEGR gas turbine system 52 to more quickly increase the mechanical and electrical power output (e.g., via increased fuel flow) in order to support the electrical grid 306 during transient events during the non-emissions compliant (with PFR) region 408. Subsequently, during the transfer zone 410, which may lack PFR or may be less sensitive to frequency changes in the electrical grid 306, the equivalence ratio of the SEGR gas turbine system 52 may be rapidly increased such that the SEGR gas turbine system 52 is operating at or near the stoichiometric ratio in the emissions compliant region (with PFR) 412, as illustrated by the loading profile 404. Once the SEGR gas turbine system 52 achieves substantially stoichiometric combustion and emissions compliance in the region 412, the SEGR gas turbine system 52 may once again respond to grid frequency variations, in accordance with the embodiments set forth above Technical effects of the present approach include enabling power exporting SEGR gas turbine systems, such as ULET power plants, to quickly increase mechanical and/or electrical power output in order to address transient events (e.g., frequency and/or voltage drops) in an attached electrical grid. In particular, certain present embodiments enable a ULET power plant to respond to transient grid events by enabling a rapid increase an amount of available oxidant in a combustor, coordinated with a rapid increase in the supply of fuel to the combustor, in order to quickly increase the mechanical and electrical power of the plant, while still maintaining an equivalence ratio at or near approximately 1. Additionally, certain embodiments may enable a ULET power plant to respond to transient grid events by enabling an increased amount of available oxidant (e.g., equivalence ratio less than 0.5) in the combustor throughout portions of plant loading (e.g., during start-up, when operating in a non-emission complaint mode) such that a rapid addition of fuel to the combustor quickly increases the mechanical and electrical power output of the plant. Other presently disclosed embodiments may enable a ULET power plant to support the electrical grid during transient events by reducing or limiting operations of certain components (e.g., a product gas compressor) of the ULET power plant in order to reduce or limit electrical power consumption within the power plant, which may temporarily increase the amount of electrical power exported from the plant.

ADDITIONAL DESCRIPTION

The present embodiments provide a system and method that enable an EGR gas turbine system (e.g., a ULET power plant) to respond to transient events (e.g., under frequency or under voltage events) in an attached power grid. The following clauses are offered as further description of the present disclosure:

Embodiment 1

A grid disturbance response method, comprising the steps of: introducing an oxidant and a first portion of a recirculated low oxygen content gas stream to at least one oxidant compressor to produce a compressed oxidant stream; introducing the compressed oxidant stream and a fuel stream in a substantially stoichiometric ratio to at least one gas turbine engine combustor and substantially mixing the said compressed oxidant stream and the said fuel stream at a location that is at least one of prior to the point of combustion or at the point of combustion; combusting said mixture of the said compressed oxidant stream and the said fuel stream to produce a high temperature high pressure low oxygen content stream; introducing the high temperature high pressure low oxygen content stream to an expander section of the said gas turbine engine and expanding the high temperature high pressure low oxygen content stream to produce mechanical power and a recirculated low oxygen content gas stream; using a first portion of the mechanical power to drive the compressor section of said gas turbine engine; using a second portion of the mechanical power to drive at least one of: a generator, the said at least one oxidant compressor or at least one other mechanical device; exporting at least a portion of the generator power to at least one of a local electrical grid or a remote electrical grid; detecting a grid transient event; and reducing the flow rate of the first portion of a recirculated low oxygen content gas stream thereby increasing the oxygen content of the compressed oxidant stream, increasing the fuel flow rate to maintain a substantially stoichiometric ratio and increasing the power output of the gas turbine engine.

Embodiment 2

A grid disturbance response method, comprising the steps of: introducing an oxidant to at least one oxidant compressor to produce a compressed oxidant stream; controlling the flow rate of the compressed oxidant stream by modulating at least one of the inlet guide vanes of the oxidant compressor, variable stator vanes or the oxidant compressor or the rotational speed of the oxidant compressor by a closed-loop feedback control system; introducing the compressed oxidant stream and a fuel stream in a substantially stoichiometric ratio to at least one gas turbine engine combustor and substantially mixing the said compressed oxidant stream and the said fuel stream at a location that is at least one of prior to the point of combustion or at the point of combustion; combusting said mixture of the said compressed oxidant stream and the said fuel stream to produce a high temperature high pressure low oxygen content stream; introducing the high temperature high pressure low oxygen content stream to an expander section of the said gas turbine engine and expanding the high temperature high pressure low oxygen content stream to produce mechanical power and a recirculated low oxygen content gas stream; using a first portion of the mechanical power to drive the compressor section of said gas turbine engine; using a second portion of the mechanical power to drive at least one of: a generator, the said at least one oxidant compressor or at least one other mechanical device; exporting at least a portion of the generator power to at least one of a local electrical grid or a remote electrical grid; detecting a grid transient event; transferring the said closed-loop feedback controller to an open-loop mode and increasing the compressed oxidant flow rate by adjusting at least one of the said inlet guide vanes, the said variable stator vanes or the said oxidant compressor speed; and increasing the fuel flow rate to maintain a substantially stoichiometric ratio and increasing the power output of the gas turbine engine.

Embodiment 3

A grid disturbance response method, comprising the steps of: introducing an oxidant to an oxidant compressor and at least one booster oxidant compressors to produce a compressed oxidant stream; controlling the flow rate of the compressed oxidant stream by modulating at least one of the inlet guide vanes of the booster oxidant compressor, variable stator vanes of the booster oxidant compressor or the rotational speed of the booster oxidant compressor by a closed-loop feedback control system; introducing the compressed oxidant stream and a fuel stream in a substantially stoichiometric ratio to at least one gas turbine engine combustor and substantially mixing the said compressed oxidant stream and the said fuel stream at a location that is at least one of prior to the point of combustion or at the point of combustion; combusting said mixture of the said compressed oxidant stream and the said fuel stream to produce a high temperature high pressure low oxygen content stream; introducing the high temperature high pressure low oxygen content stream to an expander section of the said gas turbine engine and expanding the high temperature high pressure low oxygen content stream to produce mechanical power and a recirculated low oxygen content gas stream; using a first portion of the mechanical power to drive the compressor section of said gas turbine engine; using a second portion of the mechanical power to drive at least one of: a generator, the said one oxidant compressor, the said at least one booster oxidant compressor or at least one other mechanical device; exporting at least a portion of the generator power to at least one of a local electrical grid or a remote electrical grid; detecting a grid transient event; transferring the said closed-loop feedback controller to an open-loop mode and increasing the compressed oxidant flow rate by adjusting at least one of the said inlet guide vanes, the said variable stator vanes or the said booster oxidant compressor speed; and increasing the fuel flow rate to maintain a substantially stoichiometric ratio and increasing the power output of the gas turbine engine.

Embodiment 4

A grid disturbance response method, comprising the steps of: introducing an oxidant to at least one oxidant compressor to produce a compressed oxidant stream; introducing the compressed oxidant stream and a fuel stream in a substantially stoichiometric ratio to at least one gas turbine engine combustor and substantially mixing the said compressed oxidant stream and the said fuel stream at a location that is at least one of prior to the point of combustion or at the point of combustion; combusting said mixture of the said compressed oxidant stream and the said fuel stream to produce a high temperature high pressure low oxygen content stream; introducing the high temperature high pressure low oxygen content stream to an expander section of the said gas turbine engine and expanding the high temperature high pressure low oxygen content stream to produce mechanical power and a recirculated low oxygen content gas stream; using a first portion of the mechanical power to drive the compressor section of said gas turbine engine; using a second portion of the mechanical power to drive at least one of a generator, the said at least one oxidant compressor or at least one other mechanical device; exporting at least a portion of the generator power to at least one of a local electrical grid or a remote electrical grid; extracting a second portion of the recirculated low oxygen content gas stream and introducing the said second portion to a product gas compressor to produce a compressed product gas stream; controlling the flow rate of the compressed product gas stream by modulating at least one of the inlet guide vanes of the product gas compressor, variable stator vanes of the product gas compressor or the rotational speed of the product gas compressor by a closed-loop feedback control system and delivering a first portion of the compressed product gas stream to at least one of a delivery point or storage facility; venting a third portion of the recirculated low oxygen content gas stream and controlling the flow rate of the said third portion of the recirculated low oxygen content gas stream by a closed-loop feedback control system; recycling a second portion of the compressed product gas stream to the recirculated low oxygen content gas stream and controlling the flow rate of the said second portion of the compressed product gas stream by a closed-loop feedback control system; controlling the flow rates of the said compressor product gas stream, the said third portion of the recirculated low oxygen content gas stream and the said second portion of the compressed product gas stream by an integrated control system to control at least the pressure of the said recirculated low oxygen content gas stream; detecting a grid transient event; and transferring the said compressed product gas stream closed-loop feedback controller to an open-loop mode and decreasing the compressed product gas flow rate by adjusting at least one of the said product gas compressor inlet guide vanes, the said product gas compressor variable stator vanes or the said product gas compressor speed and increasing the power available for export.

Embodiment 5

The method of any preceding embodiment, further comprising a partitioning of a ULET plant operating region into an emissions compliant zone and a non-emissions compliant zone.

Embodiment 6

The method of any preceding embodiment, wherein the gas turbine combustion equivalence ratio is controlled at a minimum level within the non-emissions compliant zone so as to maximize the oxygen available within the EGR loop in support of the traditional primary frequency response (PFR) methods Embodiment 7

The method of any preceding embodiment, wherein the transition from non-emissions compliant zone of operation to the emissions compliant zone of operation is effected by a rapid transition from a lean combustion (low equivalence ratio) to a substantially stoichiometric combustion (equivalence ratio approximately equal to 1).

Embodiment 8

The method of any preceding embodiment, wherein the transition from lean combustion to stoichiometric combustion is effected within a narrow zone with respect to plant load wherein the ULET plant control system may be temporarily rendered insensitive to grid frequency variations.

Embodiment 9

A method, comprising: combusting a fuel and an oxidant in a combustor of an exhaust gas recirculation (EGR) gas turbine system that produces electrical power and provides a portion of the electrical power to an electrical grid; and controlling one or more parameters of the EGR gas turbine system to increase the portion of the electrical power provided to the electrical grid in response to a transient event associated with the electrical grid, wherein controlling comprises one or more of: (A) increasing a flow rate of fuel to the combustor in response to the transient event when the EGR gas turbine system is operating in a fuel-lean combustion mode; (B) increasing a concentration and/or the flow rate of the oxidant in the combustor in response to the transient event, and increasing a flow rate of the fuel to the combustor in response to the increased concentration of the oxidant to maintain a substantially stoichiometric equivalence ratio in the combustor; or (C) decreasing a local consumption of the electrical power in response to the transient event to increase the portion of electrical power provided to the electrical grid.

Embodiment 10

The method of any preceding embodiment, wherein operating the EGR gas turbine system in fuel-lean combustion mode comprises operating the combustor of the EGR gas turbine system with excess oxidant present, and wherein increasing the flow rate of fuel to the combustor comprises temporarily increasing the flow rate of fuel to the combustor in response to the transient event.

Embodiment 11

The method of any preceding embodiment, comprising introducing an inlet flow comprising the oxidant and a recirculated exhaust gas to an oxidant compressor disposed upstream of the combustor in the EGR gas turbine system, and wherein increasing the concentration of the oxidant in the combustor comprises increasing a ratio of the oxidant to the recirculated exhaust gas in the inlet flow in response to the transient event.

Embodiment 12

The method of any preceding embodiment, wherein the flow rate of the recirculated exhaust gas is decreased by a programmable amount from a higher flow rate to a lower flow rate immediately or after a first programmable time delay subsequent to the transient event; and further comprising gradually increasing the flow rate of the recirculated exhaust gas to the higher flow rate after a second programmable time delay subsequent to decreasing the flow rate of the recirculated exhaust gas.

Embodiment 13

The method of any preceding embodiment, comprising controlling one or more performance parameters of at least one oxidant compressor disposed upstream of the combustor in the EGR gas turbine system, and wherein increasing the concentration of the oxidant in the combustor comprises increasing the one or more performance parameters of the at least one oxidant compressor in response to the transient event, and wherein the at least one oxidant compressor comprises a main oxidant compressor, a booster oxidant compressor, or a combination thereof.

Embodiment 14

The method of any preceding embodiment, wherein the one or more performance parameters of the at least one oxidant compressor comprise: an inlet guide vane position, a variable stator vane position, a speed, an inlet throttle valve position, a discharge throttle valve position, or a recycle valve position.

Embodiment 15

The method of any preceding embodiment, wherein increasing the one or more performance parameters of the at least one oxidant compressor comprises increasing the one or more performance parameters of the at least one oxidant compressor by a programmable amount from a lower performance setting to a higher performance setting immediately or after a first programmable time delay subsequent to the transient event; and further comprising gradually decreasing the one or more performance parameters of the at least one oxidant compressor to the lower performance setting after a second programmable time delay subsequent to increasing the one or more performance parameters of the at least one oxidant compressor.

Embodiment 16

The method of any preceding embodiment, wherein decreasing the local consumption of the electrical power comprises reducing one or more performance parameters of a product gas compressor by a programmable amount from a higher performance setting to a lower performance setting immediately or after a first programmable time delay subsequent to the transient event; and further comprising gradually increasing the one or more performance parameters of the product gas compressor to the higher performance setting after a second programmable time delay subsequent to decreasing the one or more performance parameters of the product gas compressor.

Embodiment 17

The method of any preceding embodiment, wherein the one or more performance parameters of the product gas compressor comprise: an inlet guide vane position, a variable stator vane position, a speed, an inlet throttle valve position, a discharge throttle valve position, or a recycle valve position.

Embodiment 18

The method of any preceding embodiment, comprising temporarily increasing one or more programmable constraints of the EGR gas turbine system immediately or after a first programmable time delay subsequent to the transient event, and wherein the one or more programmable constraints of the EGR gas turbine system comprise a torque limit, a speed limit, a pressure limit, a flow rate limit, or a power limit of the EGR gas turbine system.

Embodiment 19

The method of any preceding embodiment, wherein the EGR gas turbine system is part of an ultra-low emissions technology (ULET) power plant.

Embodiment 20

A system, comprising: an exhaust gas recirculation (EGR) gas turbine system, comprising: a combustor configured to receive and combust a fuel with an oxidant; and a turbine driven by combustion products from the combustor; a generator driven by the turbine, wherein the generator is configured to generate electrical power and to export a portion of the electrical power to an electrical grid; and a control system, comprising: a closed-loop controller configured to control one or more parameters of the EGR gas turbine system; and an open-loop controller configured to temporarily control the one or more parameters of the EGR gas turbine system to increase the portion of the electrical power exported to the electrical grid in response to a transient event, wherein open-loop controller is configured to: provide control signals to increase a flow rate of fuel to the combustor in response to the transient event when the EGR gas turbine system is operating in a non-emissions compliant mode; and provide control signals to increase a concentration of the oxidant in the combustor, or decrease a local consumption of the electrical power, or both, in response to the transient event when the EGR gas turbine system is operating in an emissions compliant mode.

Embodiment 21

The system of any preceding embodiment, wherein the closed-loop controller is configured to provide control signals to increase the flow rate of the fuel to the combustor in response to the increased concentration of the oxidant to maintain a substantially stoichiometric equivalence ratio in the combustor.

Embodiment 22

The system of any preceding embodiment, comprising at least one oxidant compressor disposed upstream of the combustor and configured to receive an inlet flow comprising an oxidant flow and a recirculated exhaust gas flow, wherein the open-loop controller is configured to provide control signals to a control valve to increase a ratio of the oxidant flow to the recirculated exhaust gas flow by reducing the recirculated exhaust gas flow in response to the transient event.

Embodiment 23

The system of any preceding embodiment, comprising at least one oxidant compressor disposed upstream of the combustor, and wherein the open-loop controller is configured to provide control signals to the at least one oxidant compressor to modulate one or more performance parameters of the at least one oxidant compressor in response to the transient event, and wherein the one or more performance parameters of the at least one oxidant compressor comprise: an inlet guide vane position, a variable stator vane position, a speed, an inlet throttle valve position, a discharge throttle valve position, or a recycle valve position.

Embodiment 24

The system of any preceding embodiment, comprising a product gas compressor configured to receive and compress a flow of exhaust gas from an exhaust gas recirculation (ERG) loop of the EGR gas turbine system, wherein the open-loop controller is configured to provide control signals to the product gas compressor to modulate one or more of: an inlet guide vane position, a variable stator vane position, a speed, an inlet throttle valve position, a discharge throttle valve position, or a recycle valve position of the product gas compressor in order to decrease the local consumption of the electrical power by the product gas compressor.

Embodiment 25

The system of any preceding embodiment, wherein the control system is configured to provide control signals to maintain an equivalence ratio of between approximately 0.3 and 0.7 in the combustor of the EGR gas turbine system when the EGR gas turbine system is operated in the non-emissions compliant mode.

Embodiment 26

A non-transitory, computer readable medium storing instructions executable by a processor of an electronic device, the instructions including: instructions to determine that a transient event is occurring in an electrical grid coupled to an EGR gas turbine system, wherein the transient event is an under-frequency or an under-voltage event; instructions to increase a flow rate of fuel to a combustor of the EGR gas turbine system in response to the transient event when the EGR gas turbine system is operating in a non-stoichiometric combustion mode; and instructions to increase a flow rate of oxidant to the combustor before increasing the flow rate of fuel to the combustor, or to decrease a local consumption of the electrical power to increase a portion of the electrical power that is exported to the attached electrical grid, or both, in response to the transient event when the EGR gas turbine system is operating in a stoichiometric combustion mode.

Embodiment 27

The medium of any preceding embodiment, wherein the instructions to increase the flow rate of oxidant to the combustor comprise instructions to provide a control signal to a control valve disposed upstream of an oxidant compressor in an EGR loop of the EGR gas turbine system to decrease a flow of recirculated exhaust gas to an inlet of the oxidant compressor in response to the transient event.

Embodiment 28

The medium of any preceding embodiment, wherein the instructions to increase the flow rate of oxidant to the combustor comprise instruction to modulate one or more of: an inlet guide vane position, a variable stator vane position, a speed, an inlet throttle valve position, a discharge throttle valve position, or a recycle valve position of at least one oxidant compressor disposed upstream of the combustor in response to the transient event to increase performance of the at least one oxidant compressor.

Embodiment 29

The medium of any preceding embodiment, wherein the instructions to decrease the local consumption of the electrical power comprise instructions to modulate one or more of: an inlet guide vane position, a variable stator vane position, a speed, an inlet throttle valve position, a discharge throttle valve position, or a recycle valve position, of a product gas compressor to reduce power consumption by the product gas compressor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an exhaust gas recirculation (EGR) gas turbine system, comprising:
a combustor configured to receive and combust a fuel with an oxidant; and
a turbine driven by combustion products from the combustor;
a generator driven by the turbine, wherein the generator is configured to generate electrical power and to export a portion of the electrical power to an electrical grid; and
a control system, comprising:
a closed-loop controller configured to control one or more parameters of the EGR gas turbine system; and
an open-loop controller configured to temporarily control the one or more parameters of the EGR gas turbine system to increase the portion of the electrical power exported to the electrical grid to provide a Primary Frequency Response (PFR) in response to a transient event associated with the electrical power in the electrical grid, wherein the open-loop controller is configured to:
provide control signals to increase a flow rate of fuel to the combustor to provide the PFR in response to the transient event and the EGR gas turbine system operating in a non-emissions compliant mode; and
provide control signals to increase a concentration of the oxidant in the combustor, or decrease a local consumption of the electrical power, or both, to provide the PFR in response to the transient event and the EGR gas turbine system operating in an emissions compliant mode.

2. The system of claim 1, wherein the closed-loop controller is configured to provide control signals to increase the flow rate of the fuel to the combustor in response to the increased concentration of the oxidant to maintain a substantially stoichiometric equivalence ratio in the combustor.

3. The system of claim 1, comprising at least one oxidant compressor disposed upstream of the combustor and configured to receive an inlet flow comprising an oxidant flow and a recirculated exhaust gas flow, wherein the open-loop controller is configured to provide control signals to a control valve to increase a ratio of the oxidant flow to the recirculated exhaust gas flow by reducing the recirculated exhaust gas flow to provide the PFR in response to the transient event.

4. The system of claim 1, comprising at least one oxidant compressor disposed upstream of the combustor, and wherein the open-loop controller is configured to provide control signals to the at least one oxidant compressor to modulate one or more performance parameters of the at least one oxidant compressor to provide the PFR in response to the transient event, and wherein the one or more performance parameters of the at least one oxidant compressor comprise: an inlet guide vane position, a variable stator vane position, a speed, an inlet throttle valve position, a discharge throttle valve position, or a recycle valve position.

5. The system of claim 4, wherein the at least one oxidant compressor comprises a main oxidant compressor, a booster oxidant compressor, or a combination thereof.

6. The system of claim 1, comprising a product gas compressor configured to receive and compress a flow of exhaust gas from an exhaust gas recirculation (EGR) loop of the EGR gas turbine system, wherein the open-loop controller is configured to provide control signals to the product gas compressor to modulate one or more of: an inlet guide vane position, a variable stator vane position, a speed, an inlet throttle valve position, a discharge throttle valve position, or a recycle valve position of the product gas compressor in order to decrease the local consumption of the electrical power by the product gas compressor.

7. The system of claim 1, wherein the control system is configured to provide control signals to maintain an equivalence ratio of between approximately 0.3 and 0.7 in the combustor of the EGR gas turbine system in response to the transient event and the EGR gas turbine system operating in the non-emissions compliant mode.

8. The system of claim 1, wherein the control system is configured to provide control signals to maintain an equivalence ratio of between approximately 0.95 and 1.05 in the combustor of the EGR gas turbine system in response to the transient event and the EGR gas turbine system operating in the emissions compliant mode.

9. The system of claim 1, wherein the transient event comprises a rapid change of 1% in frequency of the electrical power in the electrical grid.

10. The system of claim 1, comprising one or more sensors coupled to the electrical grid and to the control system, wherein the control system is configured to detect the transient event associated with the electrical power in the electrical grid via feedback from the one or more sensors.

11. The system of claim 1, wherein the open-loop controller is configured to temporarily control the one or more parameters of the EGR gas turbine system after a first programmable time delay subsequent to the transient event associated with the electrical power in the electrical grid.

12. The system of claim 11, wherein the control system is configured to return control of the one or more parameters of the EGR gas turbine system from the open-loop controller to the closed-loop controller after a second programmable time delay subsequent to the first programmable time delay.

13. A system, comprising:
a control system configured to control one or more parameters of an exhaust gas recirculation (EGR) gas turbine system to control a portion of electrical power for export from a generator driven by the turbine to an electrical grid, the control system comprising:
a closed-loop controller configured to control one or more parameters of the EGR gas turbine system; and
an open-loop controller configured to temporarily control the one or more parameters of the EGR gas turbine system to increase the portion of the electrical power exported to the electrical grid to provide a Primary Frequency Response (PFR) in response to a transient event associated with the electrical power in the electrical grid, wherein the open-loop controller is configured to provide control signals to increase a concentration of an oxidant in a combustor to provide the PFR in response to the transient event and the EGR gas turbine system operating in an emissions compliant mode.

14. The system of claim 13, wherein the control system is configured to provide control signals to maintain an equivalence ratio of between approximately 0.95 and 1.05 in the combustor of the EGR gas turbine system in response to the transient event and the EGR gas turbine system operating in the emissions compliant mode.

15. The system of claim 13, comprising at least one oxidant compressor configured to receive an inlet flow comprising an oxidant flow and a recirculated exhaust gas flow, wherein the open-loop controller is configured to provide control signals to a control valve to increase a ratio of the oxidant flow to the recirculated exhaust gas flow by reducing the recirculated exhaust gas flow to provide the PFR in response to the transient event.

16. The system of claim 13, comprising at least one oxidant compressor, and wherein the open-loop controller is configured to provide control signals to the at least one oxidant compressor to modulate one or more performance parameters of the at least one oxidant compressor to provide the PFR in response to the transient event, and wherein the one or more performance parameters of the at least one oxidant compressor comprise: an inlet guide vane position, a variable stator vane position, a speed, an inlet throttle valve position, a discharge throttle valve position, or a recycle valve position.

17. The system of claim 13, comprising one or more sensors coupled to the electrical grid and to the control system, wherein the control system is configured to detect the transient event associated with the electrical power in the electrical grid via feedback from the one or more sensors.

18. The system of claim 13, wherein the open-loop controller is configured to temporarily control the one or more parameters of the EGR gas turbine system after a first programmable time delay subsequent to the transient event associated with the electrical power in the electrical grid.

19. The system of claim 18, wherein the control system is configured to return control of the one or more parameters of the EGR gas turbine system from the open-loop controller to the closed-loop controller after a second programmable time delay subsequent to the first programmable time delay.

20. The system of claim 13, wherein the transient event comprises a rapid change of 1% in frequency of the electrical power in the electrical grid.

* * * * *